US012638945B2

(12) United States Patent
Yan et al.

(10) Patent No.: US 12,638,945 B2
(45) Date of Patent: May 26, 2026

(54) TOUCH SUBSTRATE AND DISPLAY WITH TOUCH WIRES ARRANGED BETWEEN SENSOR PATTERN

(71) Applicants: Chengdu BOE Optoelectronics Technology Co., Ltd., Chengdu (CN); BOE TECHNOLOGY GROUP CO., LTD., Beijing (CN); Beijing BOE Technology Development Co., Ltd., Beijing (CN)

(72) Inventors: Jun Yan, Beijing (CN); Xiangdan Dong, Beijing (CN); Kemeng Tong, Beijing (CN); Ting Li, Beijing (CN); Yi He, Beijing (CN); Yu Wang, Beijing (CN)

(73) Assignees: BOE Optoelectronics Technology Co., Ltd., Chengdu (CN); BOE TECHNOLOGY GROUP CO., LTD., Beijing (CN); Beijing BOE Technology Development Co., Ltd., Beijing (CN)

( * ) Notice: Subject to any disclaimer, the term of this patent is extended or adjusted under 35 U.S.C. 154(b) by 0 days.

(21) Appl. No.: 18/875,978

(22) PCT Filed: Mar. 21, 2024

(86) PCT No.: PCT/CN2024/082893
§ 371 (c)(1),
(2) Date: Dec. 17, 2024

(87) PCT Pub. No.: WO2025/194418
PCT Pub. Date: Sep. 25, 2025

(65) Prior Publication Data
US 2025/0328210 A1      Oct. 23, 2025

(51) Int. Cl.
*G06F 3/044*      (2006.01)
*G06F 3/041*      (2006.01)

(52) U.S. Cl.
CPC .......... *G06F 3/0446* (2019.05); *G06F 3/0412* (2013.01); *G06F 3/04164* (2019.05); *G06F 2203/04111* (2013.01)

(58) Field of Classification Search
CPC .. G06F 3/0446; G06F 3/0412; G06F 3/04164; G06F 2203/04111
See application file for complete search history.

(56) References Cited

U.S. PATENT DOCUMENTS

2024/0310948 A1 *   9/2024   Bok ..................... G06F 3/04164
2024/0329790 A1 *  10/2024   Liu ....................... G06F 3/0446

FOREIGN PATENT DOCUMENTS

CN        104182072 A    12/2014
CN        105607781 A     5/2016
(Continued)

*Primary Examiner* — Liliana Cerullo
(74) *Attorney, Agent, or Firm* — Westman, Champlin & Koehler, P.A.

(57)      ABSTRACT

A touch substrate, a touch display substrate and a touch display device are provided. The touch substrate includes a touch layer including first sensor patterns and second sensor patterns, the first sensor patterns extend in first direction and are spaced apart in second direction, the second sensor patterns extend in second direction and are spaced apart in first direction; at least one of first sensor pattern and second sensor pattern includes body portion and bridge portion, a touch wire region is provided between at least some adjacent body portions, and body portions located on two sides of touch wire region are connected through bridge portion; and the touch substrate further includes touch wires and lead wires, one end of touch wire is connected with sensor pattern, and the other end of touch wire is connected with lead wire, at least some of touch wires are arranged in touch wire region.

17 Claims, 16 Drawing Sheets

(56)                 References Cited

FOREIGN PATENT DOCUMENTS

| CN | 106227386 | A | 12/2016 |
| CN | 112732127 | A | 4/2021 |
| CN | 113391728 | A | 9/2021 |
| CN | 116737013 | A | 9/2023 |
| JP | 2017049749 | A | 3/2017 |

* cited by examiner

30

30

TL23(TL233)

TL23(TL234)

TA(TA1)

TA(TA2)

Y

X

TL2

SP2

TOUCH SUBSTRATE AND DISPLAY WITH TOUCH WIRES ARRANGED BETWEEN SENSOR PATTERN

CROSS-REFERENCE TO RELATED APPLICATIONS

This Application is a Section 371 National Stage Application of International Application No. PCT/CN2024/082893, filed on Mar. 21, 2024, entitled "TOUCH SUBSTRATE, TOUCH DISPLAY SUBSTRATE AND TOUCH DISPLAY DEVICE", the content of which is hereby incorporated by reference in its entirety.

TECHNICAL FIELD

The present disclosure relates to a field of display technology, and in particular, to a touch substrate, a touch display substrate and a touch display device.

BACKGROUND

With the rapid development of Active-matrix organic light-emitting diode (abbreviated as AMOLED), the development of touch display devices has entered the era of narrow bezel and full screen. In order to bring users a better experience, characteristics such as full screen, narrow bezel, high resolution, rollable wearability, and foldability have gradually become important development directions of AMOLED display devices. With the reduction of the panel bezel, the peripheral wiring space is compressed, and ow to optimize the touch wire design is one of the important topics for researchers to study.

The above information disclosed in this section is only for understanding the background of the technical concept of the present disclosure, and therefore, the above information may contain information that does not constitute the related art.

SUMMARY

In one aspect, there is provided a touch substrate including a touch layer, the touch substrate includes sensor patterns, wherein the sensor patterns include first sensor patterns and second sensor patterns, the first sensor patterns extend in a first direction and are spaced apart in a second direction intersecting with the first direction, the second sensor patterns extend in the second direction and are spaced apart in the first direction, and the first sensor pattern is insulated from the second sensor pattern;

at least one of the first sensor pattern and the second sensor pattern includes a body portion and a bridge portion, a touch wire region is provided between at least some adjacent body portions, and body portions located on two sides of the touch wire region are connected through the bridge portion;

the touch substrate further includes touch wires and lead wires, one end of the touch wire is connected with the sensor pattern, and the other end of the touch wire is connected with the lead wire, wherein at least some of the touch wires are arranged in the touch wire region, and an orthographic projection of the touch wire on a plane where the sensor pattern is located does not overlap with an orthographic projection of the body portion on the plane where the sensor pattern is located.

According to some exemplary embodiments, the touch wire region includes a plurality of rows of first touch wire sub-regions extending in the first direction and a plurality of columns of second touch wire sub-regions extending in the second direction, wherein the first direction is a row direction, the second direction is a column direction, and the plurality of rows of first touch wire sub-regions intersect with the plurality of columns of second touch wire sub-regions, so as to form the touch wire region of a mesh shape.

According to some exemplary embodiments, the touch substrate includes a first side region and a second side region provided opposite to the first side region, and the first side region and the second side region both extend in the first direction;

first ends of the plurality of columns of second sensor patterns are arranged in the first side region, and the lead wires are arranged in the second side region;

the touch wires include a plurality of second touch sub-wires, wherein ends of the plurality of second touch sub-wires are respectively connected with the first ends of the plurality of columns of the second sensor patterns; and the other ends of the plurality of second touch sub-wires are respectively connected with the lead wires.

According to some exemplary embodiments, wherein the second touch sub-wire includes a first portion, a second portion and a third portion, and the second portion is located between the first portion and the third portion, wherein the second portion extends in the second direction, and the second portion is arranged in the second touch wire sub-region.

According to some exemplary embodiments, the first portion includes a first sub-portion arranged in the first touch wire sub-region and a second sub-portion arranged in the second touch wire sub-region, and the first sub-portion and the second sub-portion are arranged in a Z-shaped wiring.

According to some exemplary embodiments, the third portion includes a third sub-portion arranged in the first touch wire sub-region and a fourth sub-portion arranged in the second touch wire sub-region, and the third sub-portion and the fourth sub-portion are arranged in an L-shaped wiring.

According to some exemplary embodiments, the touch wires further include a plurality of first touch sub-wires, and the plurality of first touch sub-wires are respectively connected with the plurality of rows of first sensor patterns, wherein the first sensor pattern includes a conductive transition portion located in a middle section of the first sensor pattern, one end of the first touch sub-wire is connected with the conductive transition portion, and the other end of the first touch sub-wire is connected with the lead wire located in the second side region.

According to some exemplary embodiments, the first touch sub-wire includes a fourth portion, a fifth portion and a sixth portion, wherein the fifth portion is located between the fourth portion and the sixth portion, wherein the fourth portion is connected with the first sensor pattern, and the sixth portion is connected with the lead wire;

the fourth portion extends in the second direction, the fifth portion extends in the first direction, and the sixth portion extends in the second direction.

According to some exemplary embodiments, the fourth portion is arranged in the second touch wire sub-region;

and/or the fifth portion is arranged in the first touch wire sub-region; and/or the sixth portion is arranged in the second touch wire sub-region.

According to some exemplary embodiments, the touch substrate includes a first region, a second region and a third region sequentially arranged in the first direction, wherein the second touch sub-wires are arranged in the first region or the third region; and the first touch sub-wires are arranged in the second region.

According to some exemplary embodiments, the touch substrate includes N second touch sub-wires arranged in the first region and M second touch sub-wires arranged in the third region, wherein M is greater than or equal to 1, N is greater than or equal to 1, and M is equal to N; or M is not equal to N.

According to some exemplary embodiments, the touch substrate includes L first touch sub-wires arranged in the second region, wherein L is greater than or equal to 1;

the second region includes a first sub-region located on a first side of the conductive transition portion and a second sub-region located on a second side of the conductive transition portion, wherein a part of the plurality of rows of first sensor patterns are sequentially connected with the plurality of first touch sub-wires located in the first sub-region row by row; and another part of the plurality of rows of first sensor patterns are sequentially connected with the plurality of first touch sub-wires located in the second sub-region row by row.

According to some exemplary embodiments, the touch substrate includes a first conductive layer and a second conductive layer, wherein the body portion of the sensor pattern is located in the first conductive layer, and the bridge portion of the sensor pattern is located in the second conductive layer.

According to some exemplary embodiments, the touch substrate includes a first conductive layer and a second conductive layer, wherein the body portion of the sensor pattern includes a first body portion located in the first conductive layer and a second body portion located in the second conductive layer; and the bridge portion is located in the first conductive layer, or the bridge portion is located in the second conductive layer.

According to some exemplary embodiments, the touch wires are located in the first conductive layer; and/or a part of the touch wires are located in the first conductive layer, and the other part of the touch wires are located in the second conductive layer.

According to some exemplary embodiments, the touch substrate further includes dummy electrode wires arranged in a region of the touch wire region in which no touch wire is provided, wherein the dummy electrode wires are located in the first conductive layer; and/or a part of the dummy electrode wires are located in the first conductive layer, and the other part of the dummy electrode wires are located in the second conductive layer.

According to some exemplary embodiments, the sensor patterns include a plurality of adjacent rows of first sensor patterns, and at least some of the plurality of adjacent rows of first sensor patterns share one first touch sub-wire.

According to some exemplary embodiments, the sensor patterns include a plurality of adjacent columns of second sensor patterns, and at least some of the plurality of adjacent columns of second sensor patterns share one second touch sub-wire.

According to some exemplary embodiments, a plurality of rows of touch wires are arranged in at least one row of first touch wire sub-regions in the plurality of rows of first touch wire sub-regions; and/or a plurality of columns of touch wires are arranged in at least one column of second touch wire sub-regions in the plurality of columns of second touch wire sub-regions.

In another aspect, there is provided a touch display substrate, including the touch substrate according to any one of the above.

According to some exemplary embodiments, the touch display substrate includes a display region, and at least one of the touch wires is located in the display region.

According to some exemplary embodiments, the touch display substrate further includes a base substrate and an encapsulation layer, and the touch layer is located on a side of the encapsulation layer away from the base substrate.

In further another aspect, there is provided a touch display device, including the touch display substrate according to any one of the above.

BRIEF DESCRIPTION OF THE DRAWINGS

The above contents and other objectives, features and advantages of the present disclosure will become clearer through the following description of the embodiments of the present disclosure with reference to the accompanying drawings, in which.

5

Figure 11:
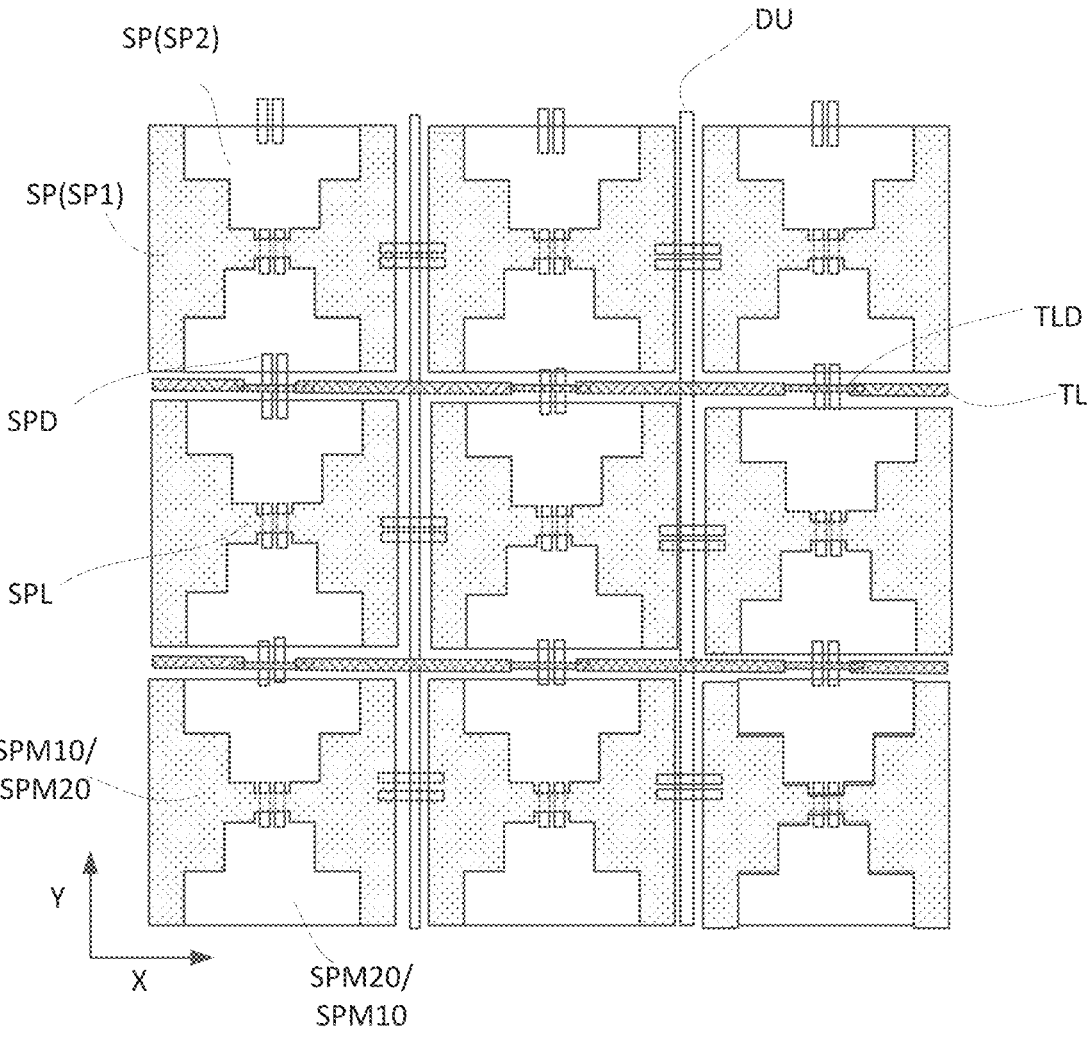
Figure 12:
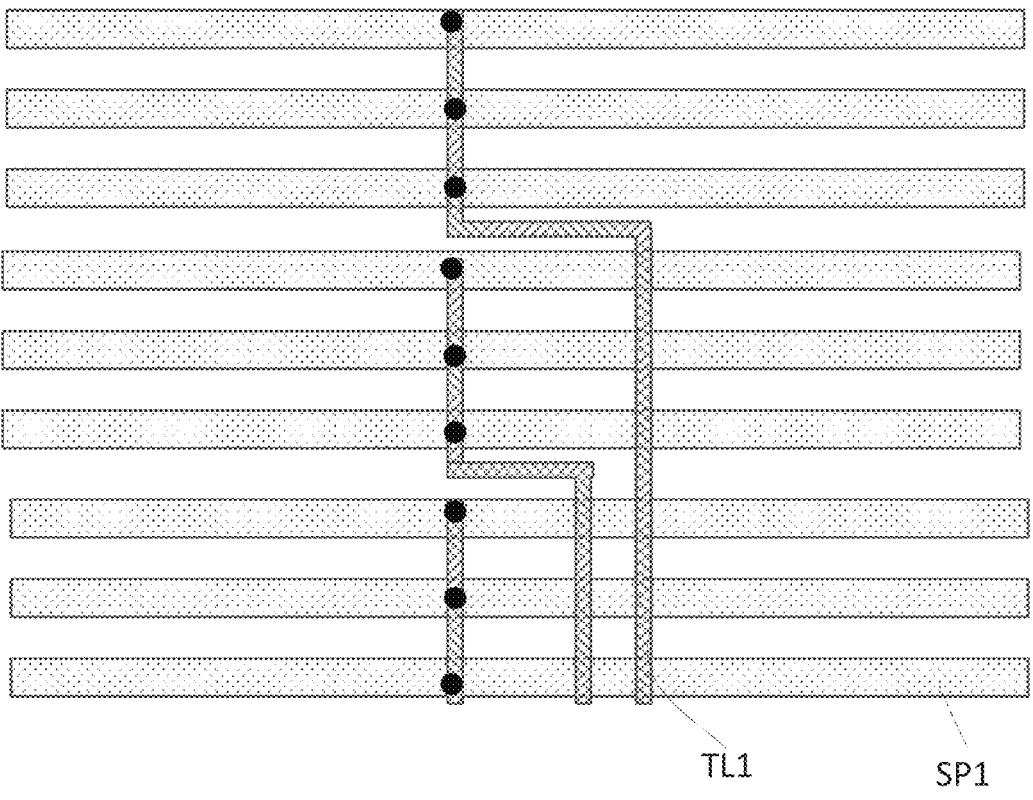
Figure 13:
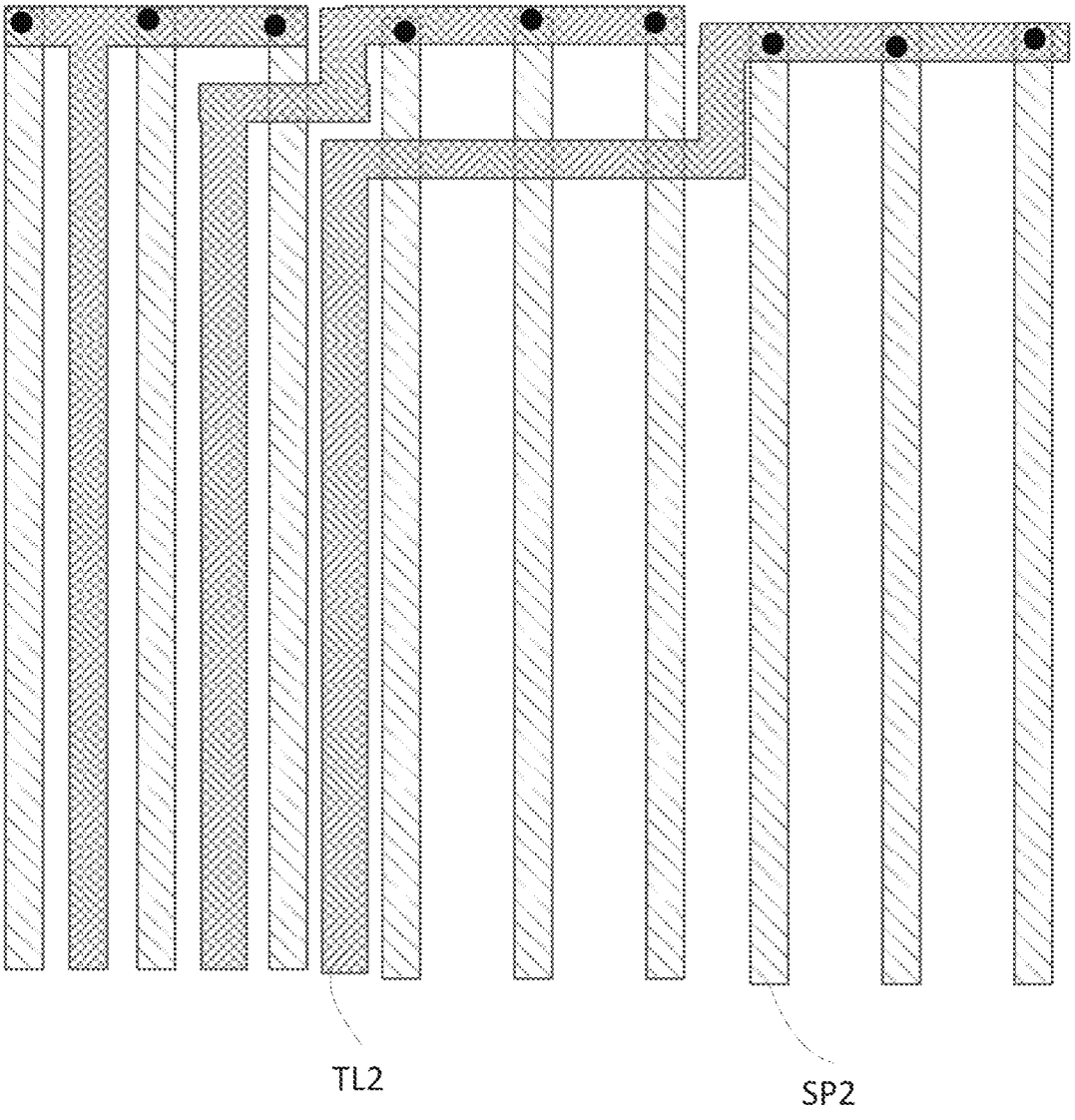
Figure 14:
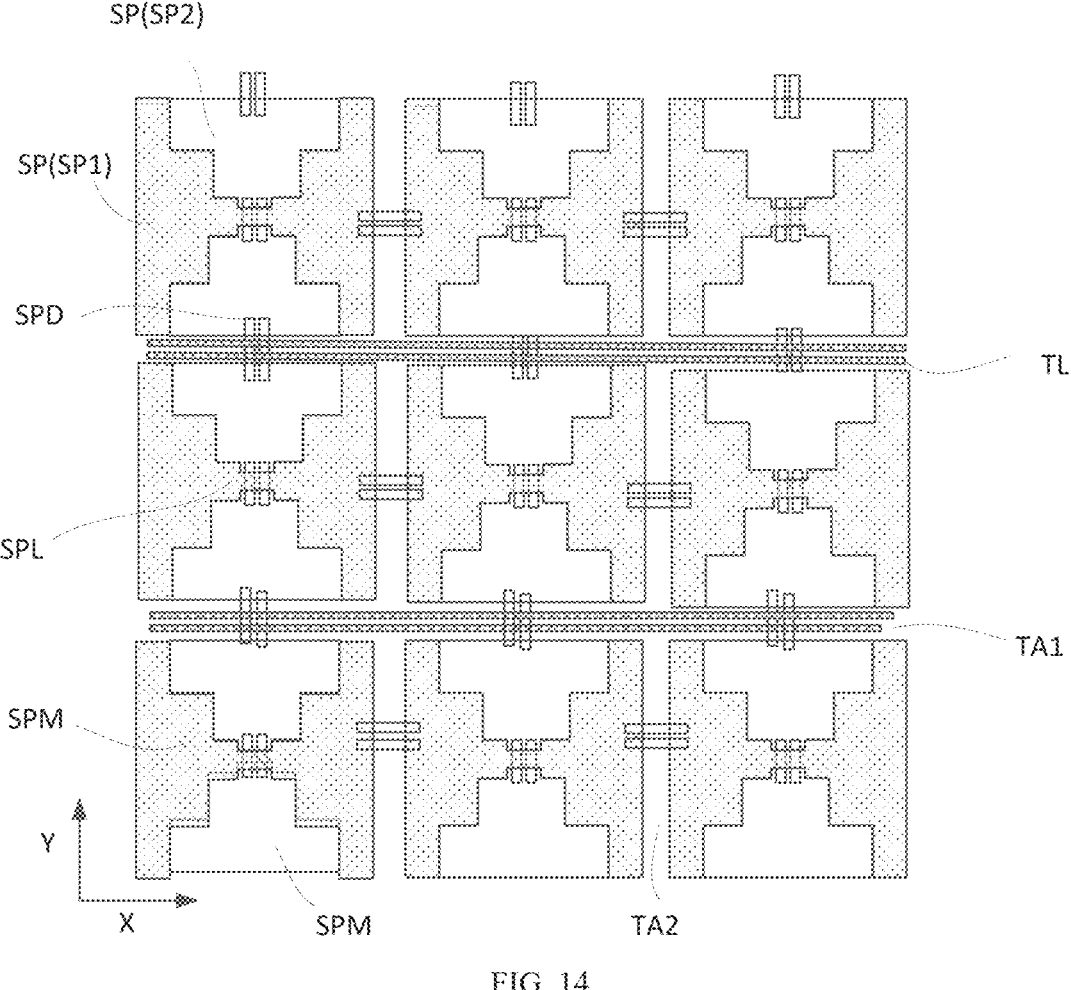
Figures 15, 16:
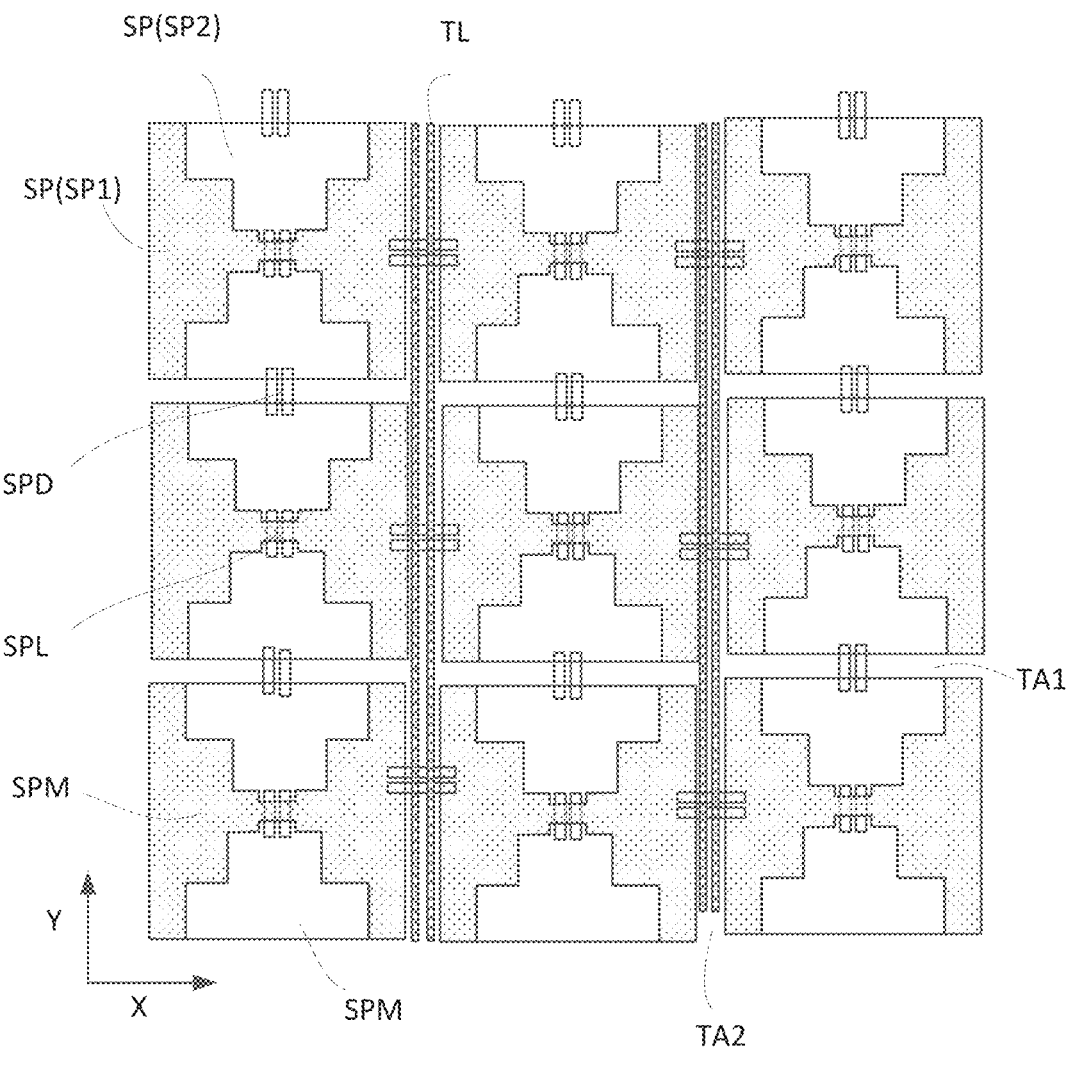

FIG. 11 is a partial plan view of the touch substrate according to the embodiments of the present disclosure;

FIG. 12 is a partial plan view of the touch substrate according to the embodiments of the present disclosure;

FIG. 13 is a partial plan view of the touch substrate according to the embodiments of the present disclosure;

FIG. 14 is a partial plan view of the touch substrate according to the embodiments of the present disclosure;

FIG. 15 is a partial plan view of the touch substrate according to the embodiments of the present disclosure; and FIG. 16 is a structural schematic diagram of a touch display device provided according to some embodiments of the present disclosure.

It should be noted that, for the sake of clarity, in the accompanying drawings used to describe the embodiments of the present disclosure, sizes of layers, structures or regions may be enlarged or reduced, i.e., these accompanying drawings are not drawn according to the actual scale.

DETAILED DESCRIPTION OF EMBODIMENTS

In order to make the purpose, the technical solution and the advantages of the embodiments of the present disclosure clearer, the technical solution of the embodiments of the present disclosure will be clearly and completely described in combination with the drawings of the embodiments of the present disclosure. Obviously, the described embodiments are a part of the embodiments of the present disclosure, not all of the embodiments. Based on the described embodiments of the present disclosure, all the other embodiments obtained by those of ordinary skills in the art without any creative work are within the protection scope of the present disclosure.

It should be noted that in the drawings, the size and the relative size of an element may be enlarged for the purpose of clarity and/or description. In this way, the size and the relative size of each element are not necessarily limited to the size and the relative size shown in the figure. In the specification and drawings, the same or similar reference sign indicates the same or similar component.

Unless otherwise defined, the technical terms or scientific terms used in the present disclosure should be the common meanings understood by those of ordinary skills in the art. The words "first", "second" and similar words used in the present disclosure do not indicate any sequence, quantity or importance, and are only used to distinguish different constituent portions. The word "include/comprise" or "contain" and a similar word mean that an element or object appearing before this word covers elements or objects listed after this word and the equivalents thereof, and does not exclude other elements or objects.

In the present text, unless otherwise specified, directional terms such as "up", "down", "left", "right", "inside" and "outside" are used to indicate an orientation relationship or a position relationship based on the drawings, and they are only used for the convenience of describing the present disclosure, and do not indicate or imply that a device, an element or a component referred to must have a specific orientation, or be constructed or operated in a specific orientation. It should be understood that when absolute positions of the described objects change, relative position relationships they represent may also change accordingly. Therefore, these directional terms may not be understood as limiting the present disclosure.

It should be noted that, in the present text, the expression a "same layer" refers to a layer structure formed by using a same film forming process to form a film layer for forming a specific pattern, and then using a same mask plate to pattern the film layer through a single patterning process. Depending on the specific pattern, a single patterning process may include a plurality of exposure, development or etching processes, and the specific pattern in the formed layer structure may be continuous and may also be discontinuous. That is, a plurality of elements, components, structures and/or portions located on a "same layer" are constituted by a same material and formed by a same single patterning process. Generally, the plurality of elements, components, structures and/or portions located on the "same layer" have approximately a same thickness.

Those skilled in the art should understand that in the present text, unless otherwise specified, the expression "height" or "thickness" refers to a size of a surface of each film layer arranged perpendicular to a display substrate, i.e., a size along a light emitting direction of the display substrate, which may also be called a size along a normal direction of a display device.

In the present text, directional expressions "first direction" and "second direction" are used to describe different directions of a touch unit, for example, a longitudinal direction and a transverse direction of the touch unit, or a row direction and a column direction of an arrangement of the touch unit. It should be understood that such expressions are only exemplary descriptions and are not limitations of the present disclosure.

Figure 1A:
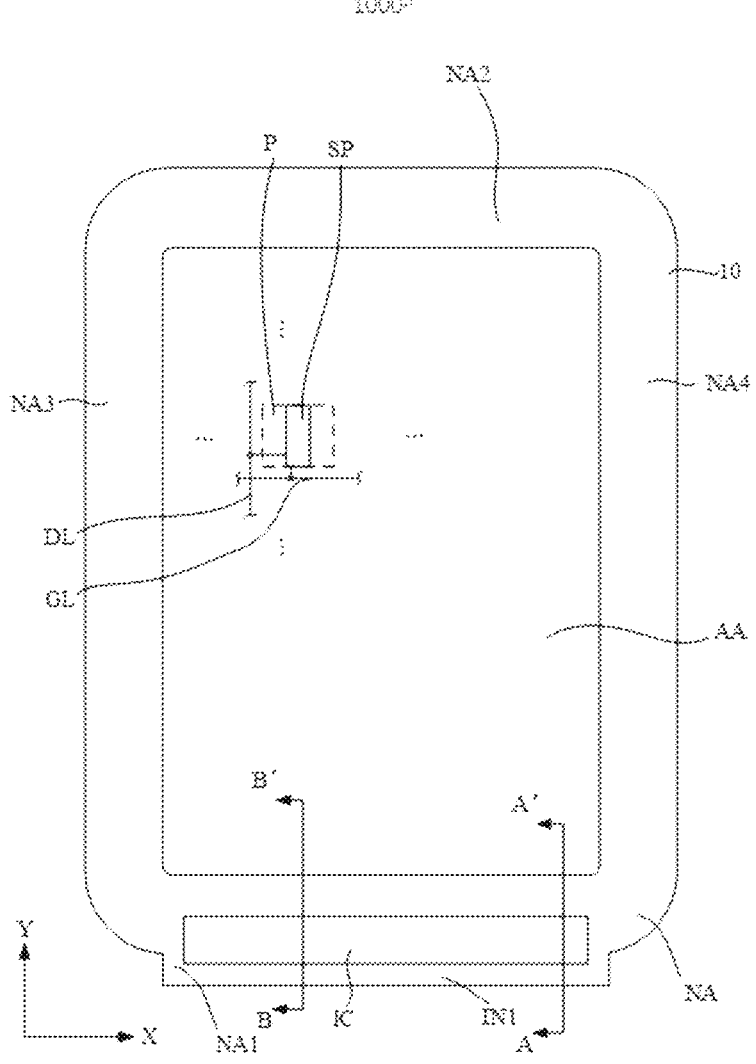
FIG. 1A is a schematic plan view of a touch display substrate according to the embodiments of the present disclosure.
Figure 1B:
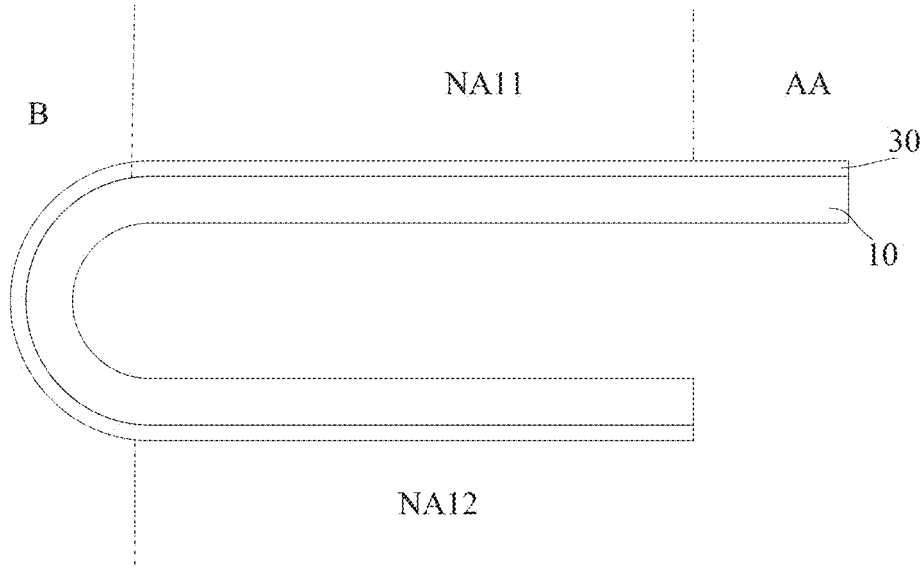
FIG. 1B is a cross-sectional view of the touch display substrate according to the embodiments of the present disclosure taken along a line AA' in FIG. 1A, which schematically shows a bending state of the touch display substrate.
Figure 1C:
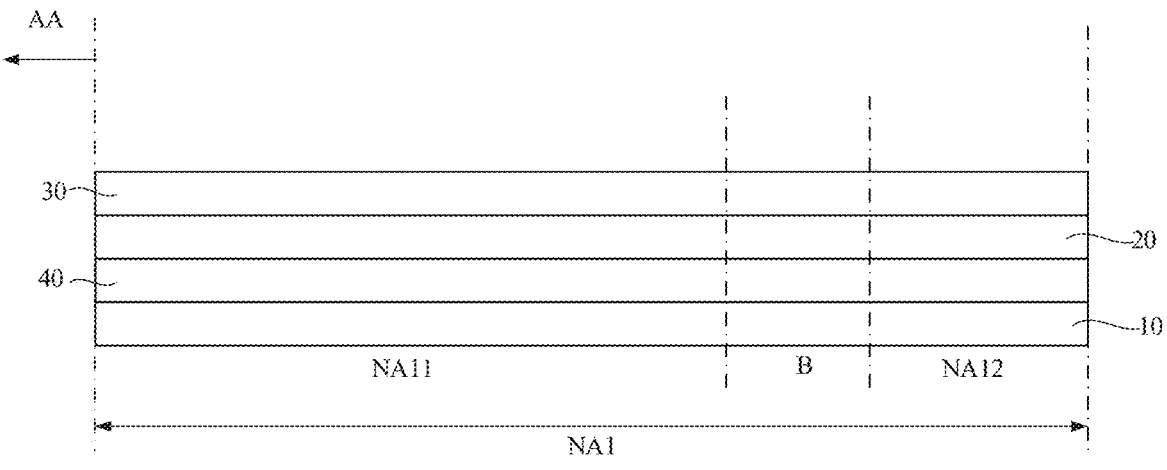
FIG. 1C is a cross-sectional view of the touch display substrate according to embodiments of the present disclosure taken along a line BB' in FIG. 1, which schematically shows an unfolding state of the touch display substrate.

FIG. 1A is a schematic plan view of a touch display substrate according to the embodiments of the present disclosure. FIG. 1B is a cross-sectional view of the touch display substrate according to the embodiments of the present disclosure taken along a line AA' in FIG. 1A, which schematically shows a bending state of the touch display substrate. FIG. 1C is a cross-sectional view of the touch display substrate according to embodiments of the present disclosure taken along a line BB' in FIG. 1, which schematically shows an unfolding state of the touch display substrate.

Referring to FIG. 1, a touch display substrate 1000 according to the embodiments of the present disclosure may include: a base substrate 10, for example, the based substrate 10 may be formed of a material such as glass, plastic and polyimide. The base substrate 10 includes a display region AA and a peripheral region (or called non-display region) NA located on at least one side of the display region AA.

The touch display substrate may include a plurality of pixel units P (schematically shown in a dotted box in FIG. 1) arranged in the display region AA, and the plurality of pixel units P may be arranged in an array on the base substrate 10 in a first direction X and a second direction Y. Each pixel unit P may further include a plurality of sub-pixels, such as red sub-pixels, green sub-pixels, and blue sub-pixels. In FIG. 1, one sub-pixel SP is schematically shown.

For example, the touch display substrate includes a signal input side IN1 (a lower side shown in FIG. 1). On the signal input side IN1, a data drive chip IC may be provided, the data drive chip IC may be electrically connected to the pixel units P located in the display region through a plurality of signal lines, and a pixel drive circuit may be electrically connected to the data drive chip IC. In this way, signals such as data signals, scanning signals, and touch signals may be transmitted from the signal input side IN1 to the plurality of pixel units P.

For example, as shown in FIG. 1A, the peripheral region NA may be located on four sides of the display region AA, i.e., it surrounds the display region AA.

It should be noted that in the accompanying drawings, the pixel units and the sub-pixels are schematically shown in a rectangular shape, but this does not constitute a limitation on the shape of the pixel units and the sub-pixels included in the touch display substrate provided in the embodiments of the present disclosure.

In the embodiments of the present disclosure, each of the pixel units P may include a pixel drive circuit and a light-emitting device electrically connected with the pixel drive circuit. For example, the light-emitting device may be an organic light-emitting diode (OLED) or a quantum dot light-emitting diode (QLED). The light-emitting device may include a first electrode, a second electrode, and a light-emitting layer arranged between the first electrode and the second electrode.

One of the first electrode and the second electrode is an anode, and the other thereof is a cathode. For example, the first electrode may be an anode. The second electrode may be a cathode. The light-emitting layer may be a multilayer structure, for example, it may include a multilayer structure formed by a hole injection layer, a hole transport layer, an organic light-emitting layer, an electron transport layer, and an electron injection layer.

It should be noted that the light-emitting device such as an organic light-emitting diode may be actively driven or passively driven. A passively driven OLED array substrate is composed of a cathode and an anode, an intersecting portion of the anode and the cathode may emit light, and the drive circuit may be externally mounted by a connection manner such as a tape-mounted package or a glass-mounted chip. An actively driven OLED array substrate may be equipped with a pixel drive circuit for each pixel, and the pixel drive circuit may include a thin film transistor with a switching function (i.e., a switching transistor), a thin film transistor with a driving function (i.e., a driving transistor), and a charge storage capacitor. In addition, the pixel drive circuit may also include other types of thin film transistors with a compensation function. It should be understood that in the embodiments of the present disclosure, the touch display substrate may be equipped with various types of known pixel drive circuit, which will not be described in detail here. For example, each pixel unit P may include a pixel drive circuit with a circuit structure in the art, such as 7T1C, 7T2C, 8T2C or 4T1C, and the pixel drive circuit works under a control of data signals transmitted through a data line as well as gate scanning signals and light-emitting control signals transmitted through a signal line, so as to drive the light-emitting device to emit light, thereby achieving operations such as display.

For example, the touch display substrate may include a drive circuit layer, and the above pixel drive circuit may be arranged in the drive circuit layer. An insulating layer may be arranged between the drive circuit layer and the light-emitting device, and the insulating layer may be a single insulating film layer or a stack composed of a plurality of insulating film layers.

For example, the touch display substrate may further include various signal lines arranged on the base substrate 10, and the various signal lines include data lines, gate scanning signal lines, light-emitting control signal lines, first power supply lines, second power supply lines, etc., so as to provide various signals such as data signals, gate scanning signals, light-emitting control signals, first power supply voltages, and second power supply voltages to the pixel drive circuit in each sub-pixel. In the embodiment shown in FIG. 1A, a scan line GL and a data line DL are schematically shown. The scan line GL and the data line DL may be electrically connected to each pixel unit P.

Referring to FIG. 1A to FIG. IC, the touch display substrate according to the embodiments of the present disclosure has a display region AA and a peripheral region NA surrounding the display region AA. The peripheral region NA includes a first bezel region NA1, a second bezel region NA2, a third bezel region NA3 and a fourth bezel region NA4. For example, the first bezel region NA1, the second bezel region NA2, the third bezel region NA3 and the fourth bezel region NA4 may be respectively regarded as a lower bezel, an upper bezel, a left bezel and a right bezel of the touch display substrate.

When observed from a front side of the touch display substrate, the touch display substrate according to the embodiments of the present disclosure has a display region and a peripheral region. The display region of the touch display substrate is provided with light-emitting pixels and may display images. The display region is surrounded by the peripheral region. Typically, when observed from the front side, the display region is provided with a bezel region all around. However, it is desired for some touch display substrates that the bezel region is as narrow as possible from the perspective of aesthetics. Therefore, in applications such as full-screen mobile phones, the display region may not be provided with a bezel region on left, right, and top sides. Nevertheless, the touch display substrate still needs to have at least one bezel region for centrally accommodating necessary circuits that are difficult to bend, and this bezel region is usually located below the display region. For example, even in the current full-screen mobile phone applications, there is still a lower bezel region below the mobile phone where no image is displayed. It should be understood that the expressions "upper", "lower", "left", "right", "front", and "rear" in the present text are only used for describing relative positions among components rather than absolute positions. In the present disclosure, the lower bezel is only for the convenience of describing a relative position, but it does not mean that it is necessarily located below a display screen. In addition, a conventional touch display substrate is of a rectangular shape and a lower bezel region is a rectangular region on one of its four sides, but touch display substrates of other outer contour shapes may also have a bezel region of any shape in which circuits are centrally accommodated. Any bezel having centralized circuit lines in the touch display substrate may be regarded as a lower bezel. Moreover, it is specified in the present disclosure that it is located on the lower side, and the display region is correspondingly located on the upper side.

In the embodiments of the present disclosure, at least a part of the first bezel region NA1 may be bent to the non-display side of the touch display substrate, so that an area of the non-display region in the display side of the touch display substrate may be reduced, thereby achieving a large screen and narrow bezel design of the touch display substrate. For example, the first bezel region NA1 may include a first sub-bezel region NA11, a second sub-bezel region NA12, and a bending region B. The first sub-bezel region NA11 is located on a side of the second sub-bezel region NA12 close to the display region AA, and the bending region B is arranged between the first sub-bezel region NA11 and the second sub-bezel region NA12. The bending region B may be bent in a bending axis, so that the second sub-bezel region NA12 may be bent to the non-display side of the touch display substrate. For example, structures such as a drive chip (IC) and a flexible circuit board (FPC) for controlling display and touch of the display region AA may be arranged in the second sub-bezel region NA12.

For example, referring to FIG. 1C, the touch display substrate may include a base substrate 10, a drive circuit layer 40, an encapsulation layer 20, and a touch layer 30. The drive circuit layer 40, the encapsulation layer 20 and the touch layer 30 are sequentially arranged in a direction away from the base substrate 10. By directly arranging the touch layer 30 on an inorganic layer of the encapsulation layer 20, a thickness of the touch substrate may be reduced, and this is conducive to achieving a lighter and thinner touch display.

For example, with the development of technology, the market has put forward higher and higher requirements for thinning of display devices (such as mobile phones), and the Flexible Multi-Layer On Cell (FMLOC for short) technology has emerged. In the FMLOC process, a metal grid electrode layer is made on an encapsulation layer of a display module to achieve the touch function, without a need for an external touch layer, thereby reducing an overall thickness of a display screen.

It should be noted that the embodiments of the present disclosure showing that the touch layer is located at the top of the touch display substrate are only for schematic illustration, and do not constitute a limitation on a position of the touch layer. In some embodiments of the present disclosure, the touch layer may also be located in a middle region of the touch display substrate. For example, after the touch layer is arranged on the encapsulation layer 20, other film layers may also be arranged on the touch layer, for example, a light shielding layer, a lens structure and other structural film layers. In some embodiments, some of metal wires in the touch layer may also be reused as other film layers. For example, some of the metal wires in the touch layer may be reused as a light shielding layer.

In the FMLOC touch technology, a conductive grid structure is used for patterns of the touch unit. A same film layer may be used for both the touch drive electrode and the touch sensing electrode, and the touch drive electrode and the touch sensing electrode are separated by disconnection. Touch control is achieved by monitoring a mutual capacitance value between the touch drive electrode and the touch sensing electrode at each point of the display panel.

Figure 2:
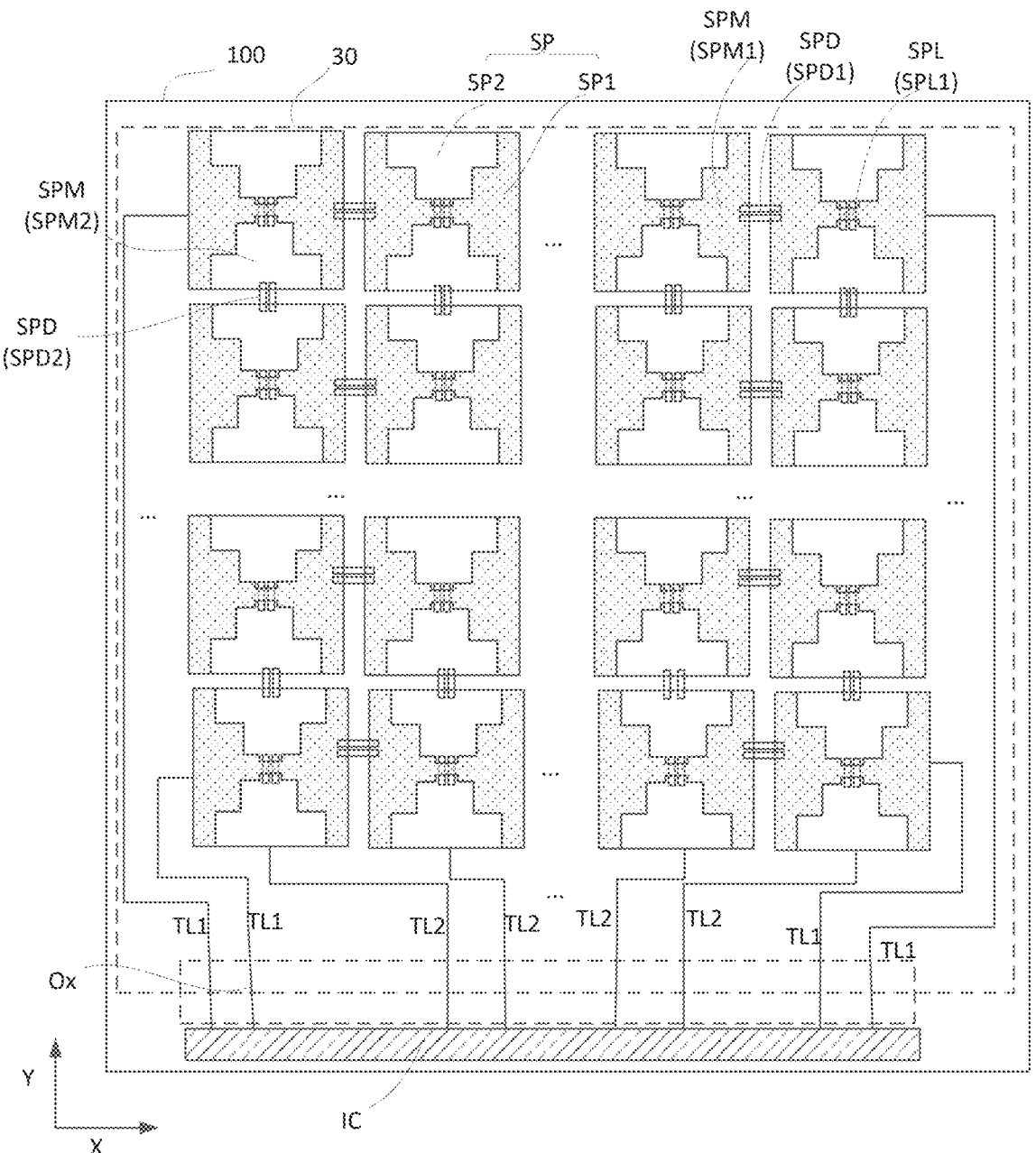
FIG. 2 is a schematic plan view of a touch substrate according to some exemplary embodiments of the present disclosure.

FIG. 2 is a schematic plan view of a touch substrate according to some exemplary embodiments of the present disclosure.

Exemplarily, in some embodiments of the present disclosure, referring to FIG. 2, the touch substrate 100 may include a touch layer 30. In an application process, the touch layer 30 (e.g., an FMLOC structure) refers to a metal grid electrode layer made on an encapsulation substrate of a display panel, so as to perform touch control. Referring to FIG. 2, the touch layer 30 includes sensor patterns SP arranged in an array. For example, the sensor patterns may include first sensor patterns SP1 and second sensor patterns SP2, the first sensor patterns SP1 extend in a first direction X and are spaced apart in a second direction Y intersecting with the first direction, the second sensor patterns SP2 extend in the second direction Y and are spaced apart in the first direction X, and the first sensor patterns SP1 are insulated from the second sensor patterns SP2. At an intersecting portion of the first sensor pattern SP1 and the second sensor pattern SP2, a bridge portion design may be used to achieve a cross-connection at the intersecting portion.

At least one of the first sensor pattern SP1 and the second sensor pattern SP2 includes a body portion SPM and a bridge portion SPD. Adjacent body portions SPM may be connected by the bridge portion SPD. In some embodiments, some of the adjacent body portions SPM1 in the first sensor pattern SP1 may also be connected by a connecting portion SPL1. The body portion SPM1 and the connecting portion SPL1 in the first sensor pattern SP1 may be located in a same layer. Adjacent body portions SPM2 in the second sensor pattern SP2 may be connected by a bridge portion SPD2, and the body portions SPM2 and the bridge portion SPD2 in the second sensor pattern SP2 may be located in different layers. Through a combined design of the body portion, the connecting portion and the bridge portion, it may be ensured that the first sensor pattern SP1 and the second sensor pattern SP2 form a grid array and are insulated from each other.

In other embodiments, the body portions in the first sensor pattern SP1 may be connected by the bridge portion, and the body portions of the second sensor pattern SP2 may be connected by the connecting portion. Alternatively, in some embodiments, the body portions in the first sensor pattern SP1 are connected by a mixed design of the connecting portion and the bridge portion, and the body portions in the second sensor pattern SP2 are connected by the bridge portion. Alternatively, in some embodiments, the body portions in the first sensor pattern SP1 are connected by the bridge portion, and the body portions in the second sensor pattern SP2 are connected by the mixed design of the connecting portion and the bridge portion.

Through a flexible design of the bridge portion and the connecting portion, various combination modes of grid-shaped sensor patterns may be achieved, and this is conducive to a subsequent wiring design of the touch wires.

The grid-shaped sensor patterns may be connected with an external drive chip through a plurality of touch wires and lead wires, so as to collect and transmit touch signals and achieve touch control. For example, further referring to FIG. 2, the plurality of rows of first sensor patterns SP1 are respectively connected to a plurality of first touch sub-wires TL1, and the first touch sub-wires TL1 may be transmission lines for sensing signals of the touch device. The plurality of columns of second sensor patterns SP2 are respectively connected to a plurality of second touch sub-wires TL2, and the second touch sub-wires TL2 may be transmission lines for sending signals of the touch device. The first touch sub-wires TL1 and the second touch sub-wires TL2 may be respectively electrically connected to the external drive chip IC through lead wires Ox, so as to collect and transmit signals of the touch device and achieve touch control.

In the related art, the touch wires are usually designed in the bezel region (i.e., non-display region) of the display device. However, with the development of narrow or even ultra-narrow bezel, the wiring space in the bezel region of the display device is getting smaller and smaller, and this compresses a wire width of the touch wire, resulting in an increase in the resistance of the touch wire. An increase in the overall load leads to a decrease in a touch drive frequency of the touch substrate, and this affects the sensitivity, signal-to-noise ratio, and reporting rate, and reduces the use effect of the touch device. In addition, for display devices with a narrower bezel or even without a bezel, it is also impossible to achieve a wiring layout by continuing to compress the wire width of the touch wire.

Figure 3:
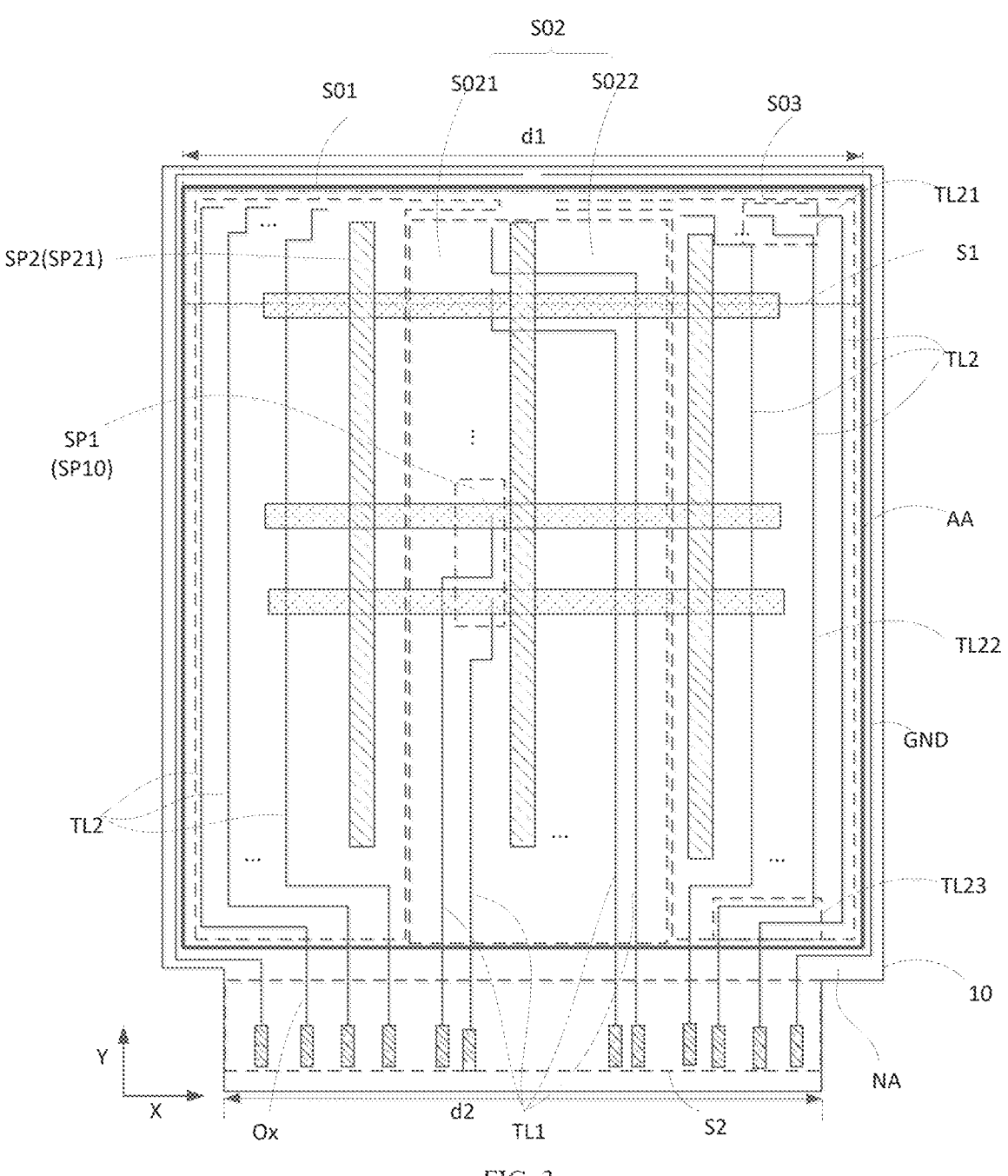
FIG. 3 is a schematic plan view of a touch substrate according to some exemplary embodiments of the present disclosure.
Figure 4:
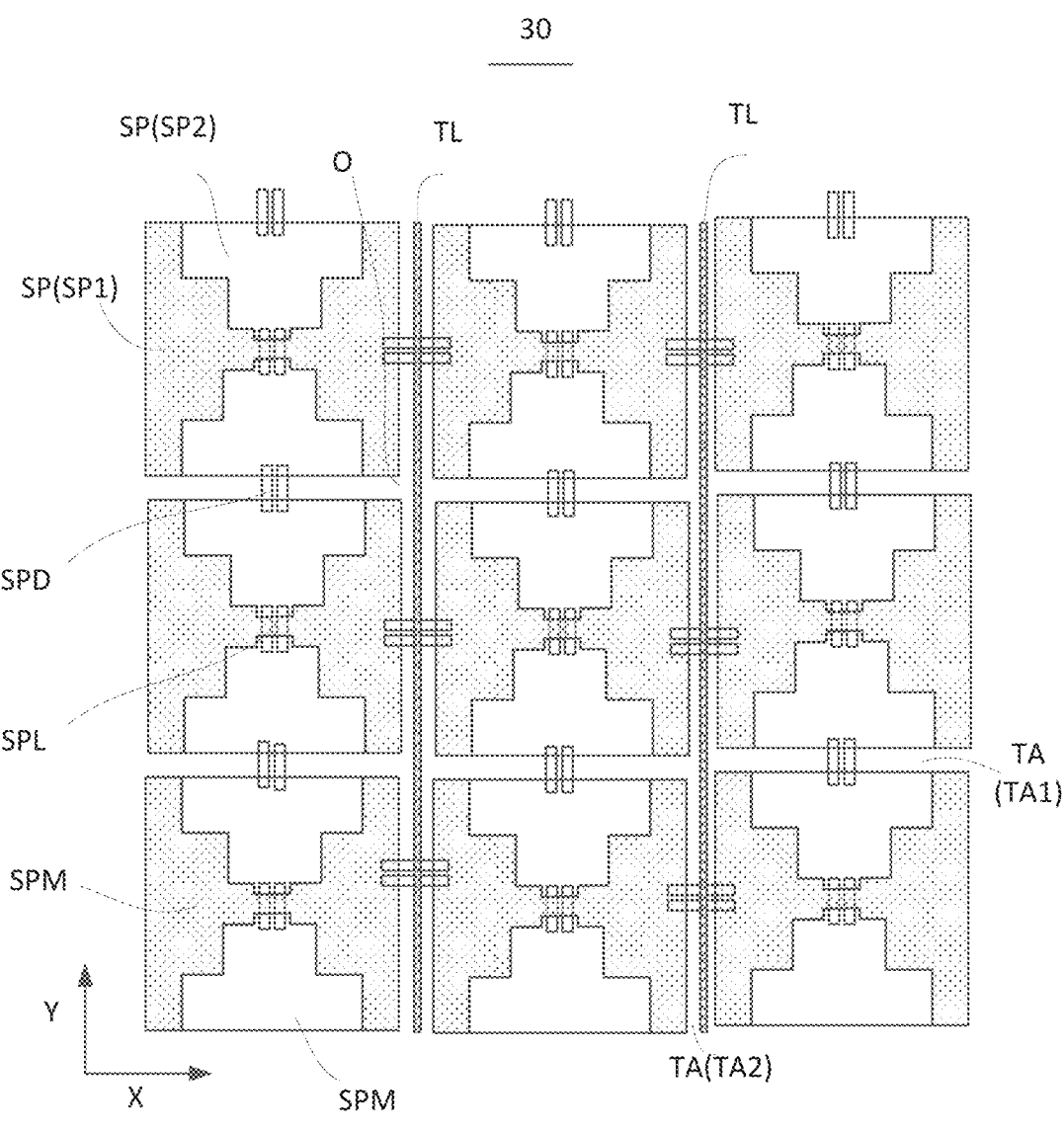
FIG. 4 is a partial plan view of the touch substrate according to FIG. 3, in which a plurality of columns of touch wires are shown.
Figure 5:
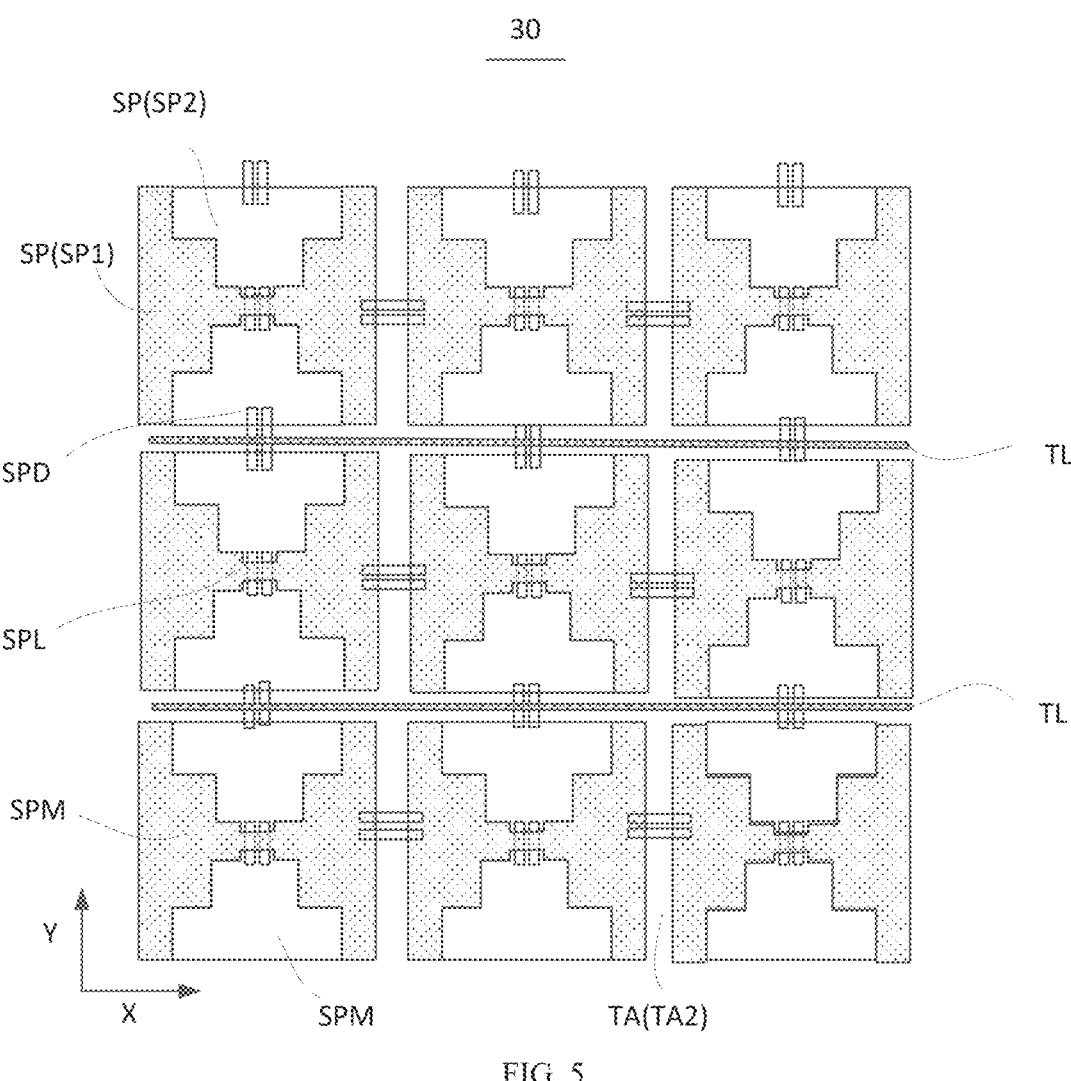
FIG. 5 is a partial plan view of the touch substrate according to FIG. 3, in which a plurality of rows of touch wires are shown.

FIG. 3 is a schematic plan view of a touch substrate according to some exemplary embodiments of the present disclosure. FIG. 4 is a partial plan view of the touch substrate according to FIG. 3, in which a plurality of columns of touch wires are shown. FIG. 5 is a partial plan view of the touch substrate according to FIG. 3, in which a plurality of rows of touch wires are shown.

Referring to FIG. 3 to FIG. 5, the touch substrate may include: a display region AA and a non-display region NA. A ground line GND may be arrange between the display region AA and a bezel of the base substrate 10, and the ground line GND may be used to reduce static electricity on the touch layer and improve the stability of the touch layer. The touch substrate may also include sensor patterns SP arranged in an array. For example, the sensor patterns may include first sensor patterns SP1 and second sensor patterns SP2, the first sensor patterns SP1 extend in a first direction X and are spaced apart in a second direction Y intersecting with the first direction, the second sensor patterns SP2 extend in the second direction Y and are spaced apart in the first direction X, and the first sensor patterns SP1 are insulated from the second sensor patterns SP2.

It should be noted that the rectangular sensor pattern in FIG. 3 is only a schematic illustration and does not constitute a limitation on the sensor pattern. In some embodiments, a mixed design of the body portion, the connecting portion, and the bridge portion as shown in FIG. 2, for example, may be used for the sensor patterns. For example, a cross-line connection may be achieved at an intersecting portion of the first sensor pattern SP1 and the second sensor pattern SP2 through a connecting portion SPL and a bridge portion SPD. At least one of the first sensor pattern SP1 and the second sensor pattern SP2 includes a body portion SPM and a bridge portion SPD, a touch wire region TA is provided between at least some of adjacent body portions SPM, and the body portions SPM located on two sides of the touch wire region TA are connected through the bridge portion SPD. The touch substrate further includes touch wires TL and lead wires Ox. One end of the touch wire TL is connected with the sensor pattern SP, and the other end of the touch wire TL is connected with the lead wire Ox. At least some of the touch wires TL are arranged in the touch wire region TA.

In some embodiments, the touch wires TL may all be located in the touch wire region TA.

Exemplarily, an orthographic projection of the touch wire TL on a plane where the sensor pattern is located does not overlap with an orthographic projection of the body portion SPM on the plane where the sensor pattern is located. The plane where the sensor pattern is located may be parallel to a plane constituted by the first direction X and the second direction Y.

The touch wire region is designed in a blank region between adjacent body portions, and the body portions are located in the display region. That is, the touch wire region is designed in the display region, and the touch wires located in the touch wire region are also designed in the display region. By flexibly designing the connection manner of the body portions in the sensor patterns, for example, by a mixed design of the connecting portion and the bridge portion, a plurality of rows or the plurality of columns of touch wire regions may be formed between the body portions. The plurality of rows of touch wire regions may be used to design the wiring of the touch wires in the first direction, and the plurality of columns of the touch wire regions may be used to design the wiring of the touch wires in the second direction. The plurality of rows of touch wire regions and the plurality of columns of the touch wire regions may include a plurality of intersecting points O, so as to facilitate a folding wire design of the touch wires at the intersecting portion. For example, referring to FIG. 4 and FIG. 5, the touch wire region TA includes a plurality of rows of first touch wire sub-regions TA1 extending in a first direction X and a plurality of columns of second touch wire sub-regions TA2 extending in a second direction Y. The first direction X is a row direction and the second direction Y is a column direction. The plurality of rows of first touch wire sub-regions TA1 intersect with the plurality of columns of the second touch wire sub-regions TA2, so as to form a grid-shaped touch wire region TA. Through a design of the grid-shaped touch wire region, a more flexible wiring space may be provided for the touch wires, and this is conducive to a better design of the touch wires, so that a good touch control effect of the touch device may be ensured while achieving a narrow bezel.

Exemplarily, in some embodiments of the present disclosure, referring to FIG. 3, the touch wires TL may be of a straight wire design, an L-shaped wire design, or a Z-shaped wire design. Alternatively, the touch wires TL may be of a mixed design of a plurality of kinds of wires, such as a straight wire, an L-shaped wire, and a Z-shaped wire. By designing a grid-shaped touch wire region TA, a sufficient wiring space may be provided for the touch wires, and this is conducive to achieving a plurality of kinds of wire designs of the touch wires and improving the control effect of the touch device.

Exemplarily, in some embodiments of the present disclosure, further referring to FIG. 3, the touch substrate 100 may include a first side region S1 and a second side region S2 arranged opposite to the first side region S1. The first side region S1 and the second side region S2 both extend in the first direction X. For example, the first side region S1 may be a region located on the upper side of the touch substrate 100 close the bezel, and the second side region S2 may be a region located on the lower side of the touch substrate 100 close to the bezel. First ends of the plurality of columns of the second sensor patterns SP2 may be arranged in the first side region S1, and the lead wires Ox may be arranged in the second side region S2. By designing the first ends of the plurality of columns of the second sensor patterns SP2 in the first side region S1, the touch wires are connected with the first ends of the second sensor patterns SP2, and combined with the folding wire design, a longitudinal wiring space in the display region may be fully utilized. The touch wires may be dispersedly arranged among the second sensor patterns SP2 in different columns, so that the connection between the plurality of columns of the sensor patterns SP2 and the lead wires may be achieved while ensuring a relatively small wire density.

Exemplarily, the touch wires TL include a plurality of second touch sub-wires TL2. Ends of the plurality of second touch sub-wires TL2 are respectively connected with the first ends of the plurality of columns of the second sensor patterns SP2, and the other ends of the plurality of second touch sub-wires TL2 are respectively connected with the plurality of lead wires Ox. That is, the plurality of columns of the second sensor patterns SP2 may be correspondingly connected with the external drive chip through the plurality of second touch sub-wires TL2 and the plurality of lead wires Ox.

Exemplarily, in the embodiments of the present disclosure, referring to FIG. 3 and FIG. 4, the touch wire region TA may be a grid-shaped touch wire region. The touch wires correspondingly connected with the first ends of the plurality of columns of the second sensor patterns SP2 may be wound in a serpentine shape in the touch wire region TA in the display region AA according to actual needs, so as to sequentially connect the first ends of the plurality of columns of the second sensor patterns SP2 with the corresponding lead wires Ox in series. For example, the second touch sub-wire TL2 includes a first portion TL21, a second portion TL22 and a third portion TL23, and the second portion TL22 is located between the first portion TL21 and the third portion TL23. The first portion TL21 and the third portion TL23 are connected in series through the second portion TL22. The second portion TL22 extends in the second direction Y, and the second portion TL22 is arranged in the second touch wire sub-region TA2. For example, the second portions TL22 may be respectively located in the plurality of columns of the second touch wire sub-regions TA2.

Exemplarily, each column in the second touch wire sub-regions TA2 is provided with a second portion TL22 of one wire. In some embodiments, a certain column or several columns in the second touch wire sub-region TA2 may be respectively provided with second portions TL22 of a plurality of wiring, or may not be provided with the second portion TL22.

Figure 6:
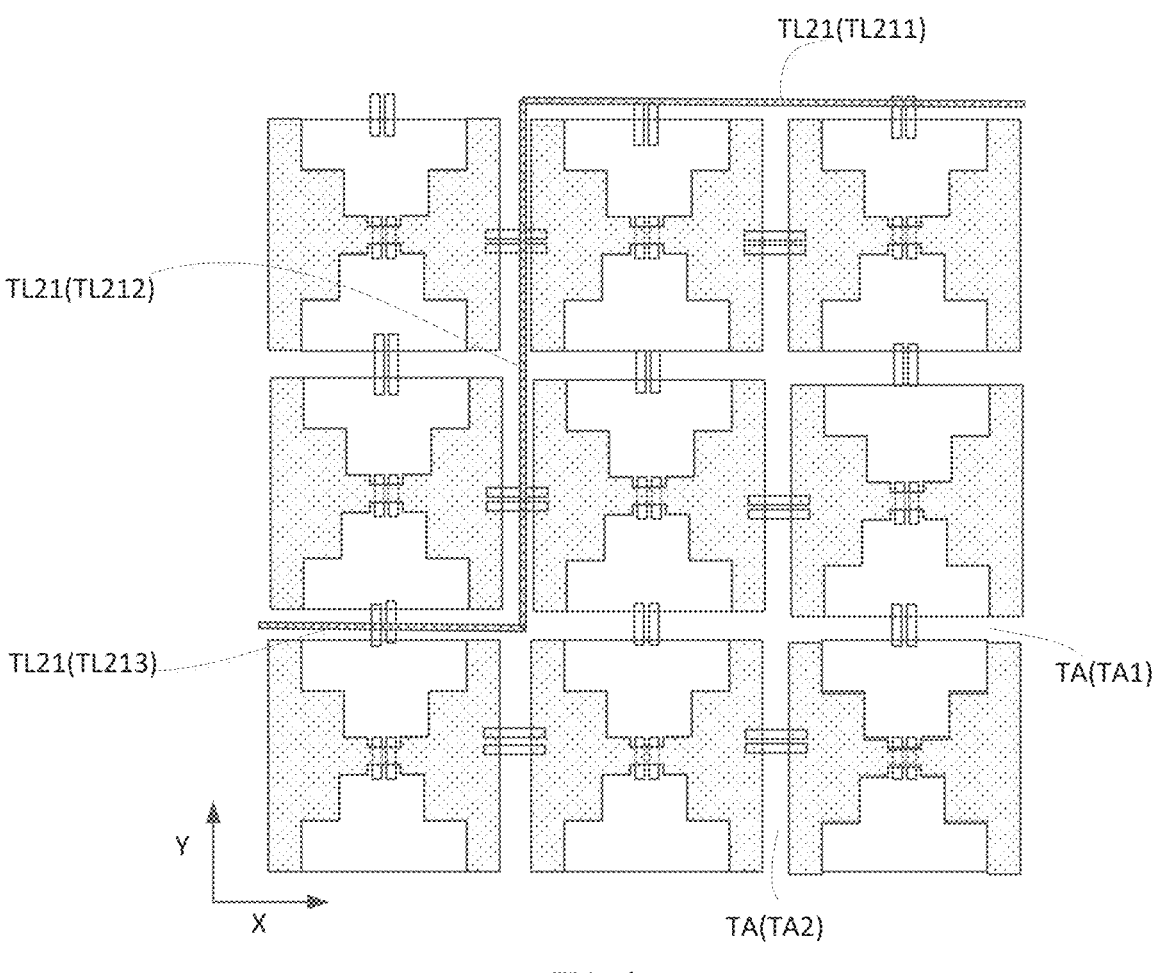
FIG. 6 is a partial plan view of the touch substrate according to FIG. 3, in which a Z-shaped touch wire is shown.
Figure 7:
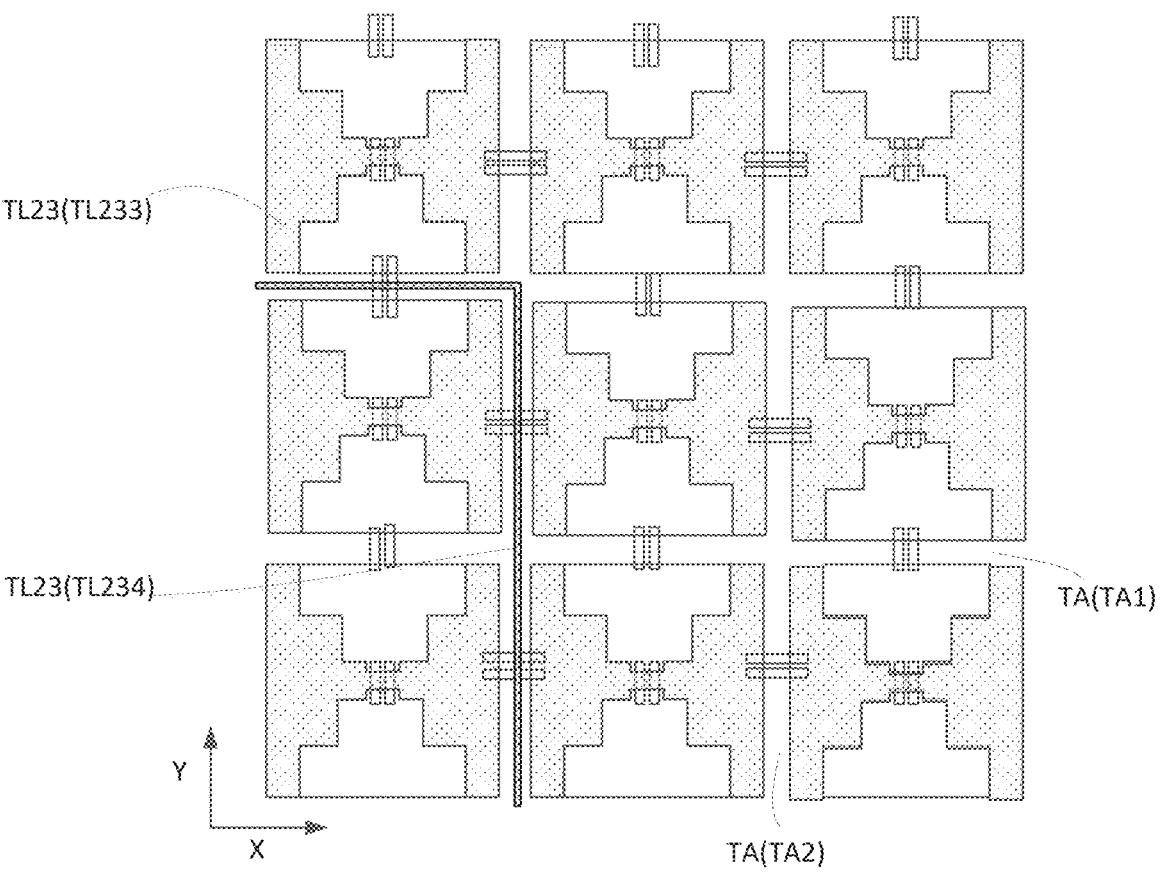
FIG. 7 is a partial plan view of the touch substrate according to FIG. 3, in which an L-shaped touch wire is shown.

FIG. 6 is a partial plan view of the touch substrate according to FIG. 3, in which a Z-shaped touch wire is shown. FIG. 7 is a partial plan view of the touch substrate according to FIG. 3, in which an L-shaped touch wire is shown.

Exemplarily, in the embodiments of the present disclosure, referring to FIG. 3 and FIG. 6, the first portion TL21 includes a first sub-portion TL211 arranged in the first touch wire sub-region TA1 and a second sub-portion TL212 arranged in the second touch wire sub-region TA2. For example, the first sub-portion TL211 and the second sub-portion TL212 may be of a Z-shaped wiring. Through the Z-shaped wiring design of the first portion TL21, the first ends of the plurality of columns of the second sensor patterns SP2 may be sequentially connected to the plurality of columns of the second portions TL22.

Referring to FIG. 3, the touch substrate may further include a first region S01 and a third region S03 opposite to the first region S01. For example, the first region S01 may include a part of a left side of the touch substrate, and the third region S03 may include a part of a right side of the touch substrate. The first region S01 and the third region S03 may be both located in the display region AA. The first portion TL21 may transfer parts of the plurality of columns of the second sensor patterns SP2 to wires of the second portion TL22 located in the first region S01, and the first portion TL21 may also transfer the other parts of the plurality of columns of the second sensor patterns SP2 to wires of the second portion TL22 located in the third region S03. Through a transfer design of the first port TL21, the touch wires connected with the plurality of columns of the second sensor patterns SP2 may be respectively transferred to a region on the left side of the touch substrate or a region on the right side of the touch substrate, so that the touch wires are caused to extend toward the second side region S2 using the wires of the second portion TL22 extending in the second direction Y, so as to be connected to the lead wires Ox located in the second side region S2.

Exemplarily, in some embodiments of the present disclosure, the first side region S1 has a first width d1 in the first direction, and the second side region S2 has a second width d2 in the first direction. In order to increase a density of the lead wires Ox, so as to facilitate connection with corresponding pins of the external chip, the second width d2 of the second side region S2 is usually smaller than the first width d1 of the first side region S1. As the widths of the second side region S2 and the first side region S1 in the first direction are inconsistent, the plurality of columns of wires of the second portion TL22 extending in the second direction Y also need to be transferred through the third portion TL23, so as to be correspondingly connected to the lead wires Ox.

For example, referring to FIG. 3 and FIG. 7, the third portion TL23 may include a third sub-portion TL233 provided in the first touch wire sub-region TA1 and a fourth sub-portion TL234 provided in the second touch wire sub-region TA2. The third sub-portion TL233 and the fourth sub-portion TL234 may be designed in an L-shaped wiring. Through the TL23 of an L-shaped design, scattered wires of the second port TL22 may be gathered, and then correspondingly connected with the lead wires Ox.

For the second touch sub-wire TL2, the first ends of the plurality of columns of the second sensor patterns SP2 located in the first edge side region S1 may be connected with a plurality of lead wires Ox located in the second side region S2 through a serpentine winding design of the first portion TL21, the second portion TL22 and the third portion TL23. The body portion (for example, the second portion TL22) of the second touch sub-wire TL2 extending in the second direction may be located in a region on the left side of the touch substrate or a region on the right side of the touch substrate, for example, in the first region S01 or the third region S03. Through such a design, the space of the grid-shaped touch wire region may be flexibly utilized to sequentially connect the plurality of columns of the second sensor patterns SP2 with the lead wires Ox, thereby achieving the connection between the second sensor patterns SP2 and the external chip pins.

Figure 8:
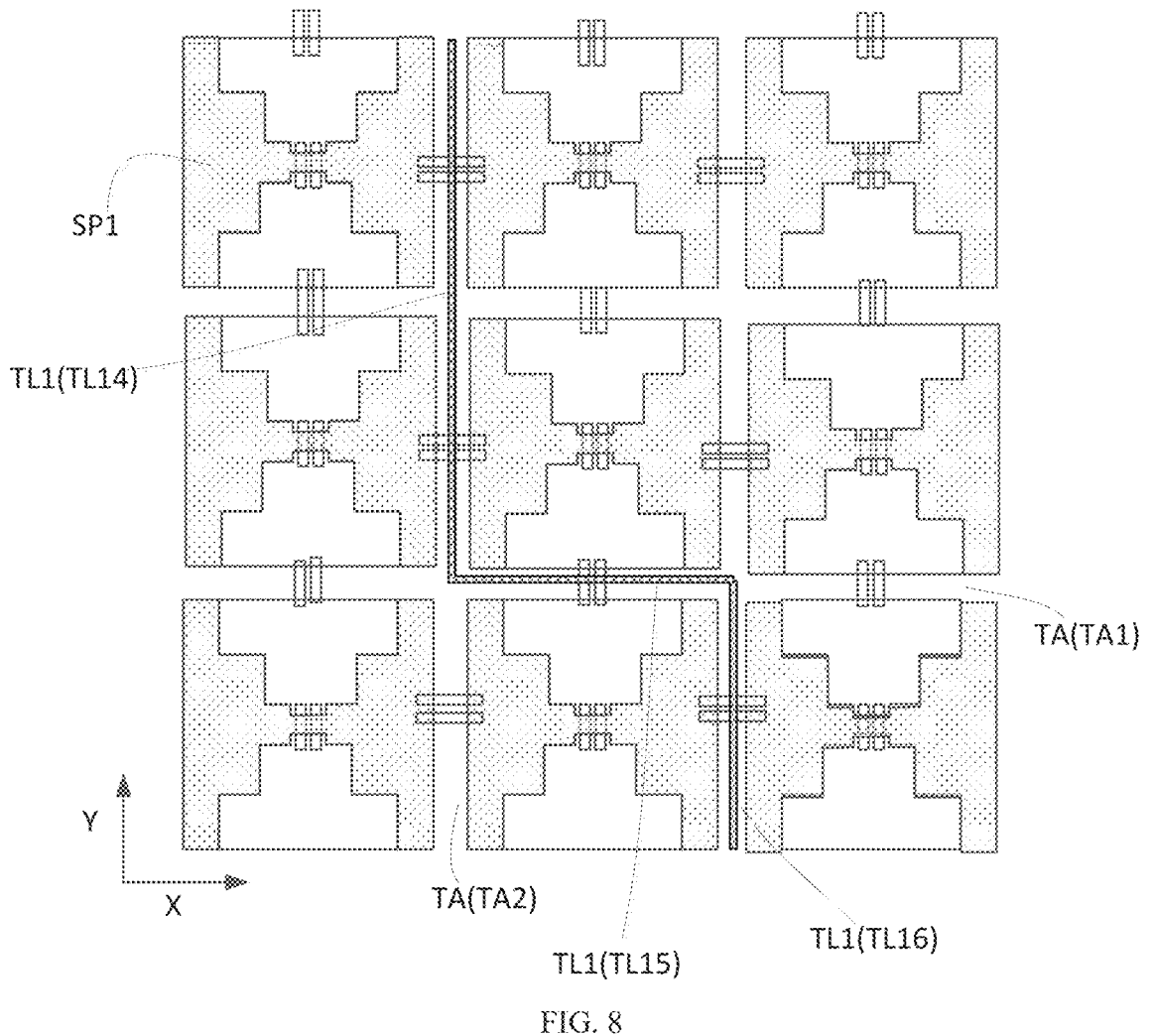
FIG. 8 is a partial plan view of the touch substrate according to FIG. 3, in which another Z-shaped touch wire is shown.

FIG. 8 is a partial plan view of the touch substrate according to FIG. 3, in which another Z-shaped touch wire is shown.

For example, in some embodiments of the present disclosure, referring to FIG. 3 and FIG. 8, the touch wires further include a plurality of first touch sub-wires TL1, and the plurality of first touch sub-wires TL1 are respectively connected with the plurality of rows of the first sensor patterns SP1. The first sensor pattern SP1 may include a conductive transition portion SP10 located in the middle section of the first sensor pattern, and the conductive transition portion SP10 may be connected to the external chip through the touch wire TL and the lead wire Ox, thereby sensing and transmitting touch signals. The conductive transition portion SP10 may be a part of the first sensor pattern SP1, and may be used for an electrical connection design with the touch wire TL. A plurality of conductive transition portions SP10 in the plurality of rows of the first sensor patterns may be aligned in the first direction X, or may not be aligned in the first direction X. For example, one end of the first touch sub-wire TL1 is connected with the conductive transition portion SP10, and the other end of the first touch sub-wire TL1 is connected with the lead wire Ox located in the second side region S2.

Exemplarily, further referring to FIG. 8, the first touch sub-wires TL1 include a fourth portion TL14, a fifth portion TL15, and a sixth portion TL16. The fifth portion TL15 is located between the fourth portion TL14 and the sixth portion TL16, and the fourth portion TL14, the fifth portion TL15, and the sixth portion TL16 are connected in series to form the first touch sub-wire TL1 in a Z shape. The fourth portion TL14 may be connected with the first sensor pattern SP1, and the sixth portion TL16 may be connected with the lead wire Ox. For example, the fourth portion TL14 extends in the second direction Y, the fifth portion TL15 extends in the first direction X, and the sixth portion TL16 extends in the second direction Y. Through a Z-shaped wiring design, the wiring space in the touch wire region may be fully utilized. For example, the sixth portion TL16 of the touch wire connected with the first sensor pattern SP1 may be designed in the second touch wire sub-regions TA2 in different columns. Thus, under the condition of ensuring a relatively small wire density, an electrical connection between each first sensor pattern and the corresponding lead wire is achieved.

Exemplarily, the fourth portion TL14 may be arranged in the second touch wire sub-region TA2. The fifth portion TL15 may be arranged in the first touch wire sub-region TA1. The sixth portion TL16 may be arranged in the second touch wire sub-region TA2. That is, at least a part of the first touch sub-wires TL1 may be arranged in the touch wire region TA located in the display region.

In some embodiments, the first touch sub-wires TL1 may be all arranged in the touch wire region TA located in the display region.

By setting the first touch sub-wire and the second touch sub-wire in the display region, the wiring space occupied by the touch wires in the bezel may be reduced, and this is conducive to achieving a narrow bezel display effect. Further, through a design of a grid-shaped touch wire region, the wiring manner of the touch wires may be flexibly designed, and this is conducive to shortening a wiring length and improving a touch control effect.

Exemplarily, in the embodiments of the present disclosure, further referring to FIG. 3, the touch substrate includes a first region S01, a second region S02 and a third region S03 sequentially arranged in the first direction X. For example, the first region S01 may include a left region of the touch substrate, the second region S02 may include a middle region of the touch substrate, and the third region S03 may include a right region of the touch substrate. The first region S01 partially overlaps with the first side region S1. The third region S03 partially overlaps with the first side region S1. The second touch sub-wire TL2 is arranged in the first region S01 or the third region S03. For example, a part of the first portion TL21 of the second touch sub-wire TL2 may be located in a region where the first region S01 overlaps with the first side region S1, and is used to transfer a part of the plurality of columns of the second sensor patterns SP2 close to the first region S01 to the left side, so that the second portions TL22 of the corresponding second touch sub-wires TL2 are sequentially arranged in the first region S01. Another part of the first portion TL21 of the second touch sub-wire TL2 may be located in a region where the third region S03 overlaps with the first side region S1, and is used to transfer a part of the plurality of columns of the second sensor patterns SP2 close to the third region S03 to the right side, so that the second portions TL22 of the corresponding second touch sub-wires TL2 are sequentially arranged in the third region S03.

Exemplarily, in some embodiments of the present disclosure, the touch substrate may include N second touch sub-wires TL2 arranged in the first region S01 and M second touch sub-wires TL2 arranged in the third region S03. M is greater than or equal to 1, and N is greater than or equal to 1. Quantities of the second touch sub-wires may be flexibly designed in the left and right regions of the touch substrate.

For example, in some embodiments, M may be equal to N. That is, a quantity of the second touch sub-wires in the first region S01 of the touch substrate is the same as a quantity of the second touch sub-wires in the third region S03, and the wires in the first region S01 and the third region S03 may be designed to be basically symmetrical.

In some embodiments, M may not be equal to N. For example, M may be greater than N. Alternatively, M may be less than N. For example, in some embodiments, a total quantity of the second touch sub-wires TL2 is an odd number, and the quantity of the second touch sub-wires TL2 in the first region S01 on the left side may be different from the quantity of the second touch sub-wires TL2 in the third region S03 on the right side, for example, M may differ from N by 1.

In some embodiments, the touch substrate may be left-right asymmetric, and the quantity M of the second touch sub-wires TL2 in the first region S01 and the quantity N of the second touch sub-wires TL2 in the third region S03 may be flexibly set according to actual needs. M may not be equal to N.

Exemplarily, in some embodiments of the present disclosure, further referring to FIG. 3, the first touch sub-wire TL1 may be provided in the second region S02. For example, the touch substrate may include L first touch sub-wires TL1 provided in the second region S02. L is greater than or equal to 1.

Exemplarily, the second region S02 may include a first sub-region S021 located on a first side (e.g., a left side) of the conductive transition portion SP10 and a second sub-region S022 located on a second side (e.g., a right side) of the conductive transition portion SP10. For example, the first sub-region S021 may be located between the first region S01 and the second sub-region S022. The second sub-region S022 may be located between the first sub-region S021 and the third region S03. A part of the plurality of rows of the first sensor patterns SP1 may be sequentially connected with the plurality of first touch sub-wires TL1 located in the first sub-region S021 row by row. The other part of the plurality of rows of the first sensor patterns may be sequentially connected with the plurality of first touch sub-wires TL1 located in the second sub-region S022 row by row. For example, referring to FIG. 3, upper the plurality of rows of first sensor patterns SP1 may be sequentially wired to the right side through a plurality of first touch sub-wires TL1, and lower the plurality of rows of first sensor patterns SP1 may be sequentially wired to the left through a plurality of first touch sub-wires TL1.

It should be noted that in the embodiments of the present disclosure, the quantities and orders of the plurality of rows of the first sensor patterns wired to the left and right sides may be specifically designed as needed, and they are not specifically limited in the embodiments of the present disclosure.

Figure 9:
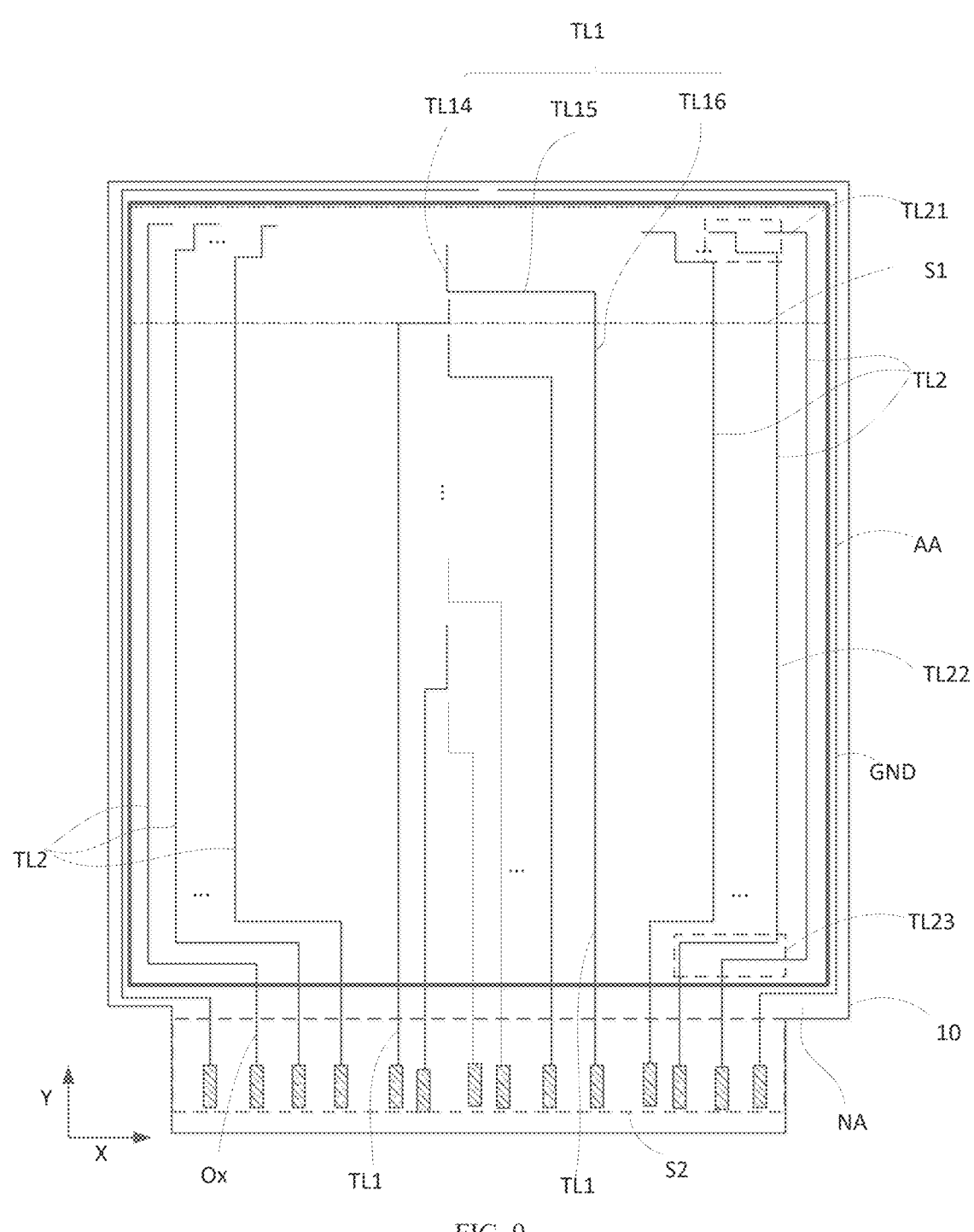
FIG. 9 is a partial plan view of a touch substrate according to exemplary embodiments of the present disclosure.

FIG. 9 is a partial plan view of a touch substrate according to exemplary embodiments of the present disclosure.

Exemplarily, referring to FIG. 3 and FIG. 9, the first sensor patterns and the first touch sub-wires TL1 may be connected in the middle and connected in the left and right half screens row by row. For example, the first sensor pattern SP1 is connected with the fourth portion TL14 of the first touch sub-wire TL1 through the conductive transition part SP10 located in the middle region. The fifth portion TL15 of the first touch sub-wire TL1 may be selectively transferred to the left side or to the right side. For example, the first sensor pattern SP1 located in an i-th row may be transferred to the left side through the fifth portion TL15, and the first sensor pattern SP1 located in an i+1-th row may be transferred to the right side through the fifth portion TL15, where i is greater than or equal to 1. By using the manner of connection in the left and right half screens row by row, a length difference of the first touch sub-wires in the left and right half screens may be reduced, and this is conducive to improving the uniformity of the left and right half screens and improving the control effect of the touch substrate.

Figure 10:
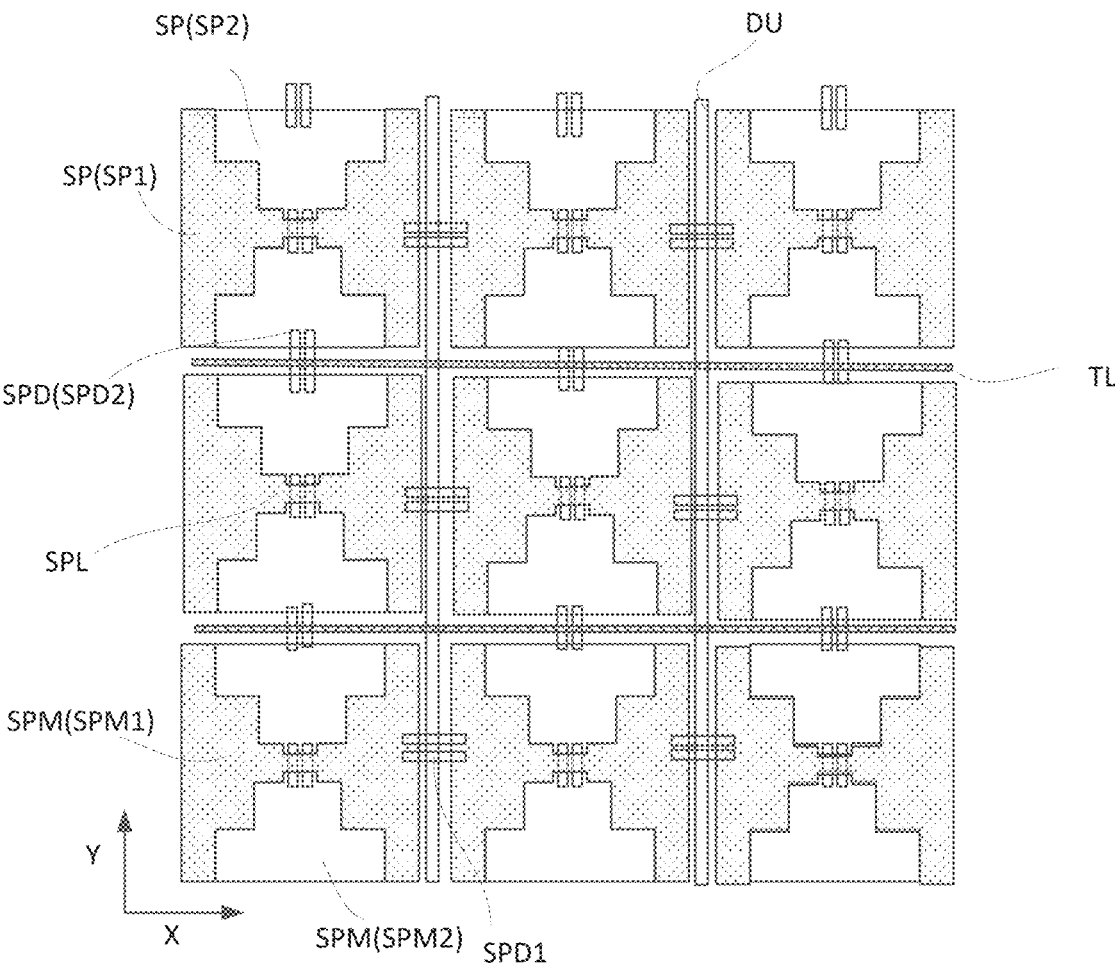
FIG. 10 is a partial plan view of the touch substrate according to the embodiments of the present disclosure.

FIG. 10 is a partial plan view of the touch substrate according to the embodiments of the present disclosure.

Exemplarily, in some embodiments of the present disclosure, the touch substrate includes a first conductive layer and a second conductive layer. Referring to FIG. 10, the body SPM of the sensor pattern SP may be located in the first conductive layer, the bridge portion SPD of the sensor pattern may be located in the second conductive layer, and the touch wire TL may be located in the first conductive layer.

For example, the first sensor pattern SP1 is located in the first conductive layer, the body portion SPM2 of the second sensor pattern SP2 is located in the first conductive layer, the bridge portion SPD2 of the second sensor pattern SP2 is located in the second conductive layer, and the touch wire TL is located in the first conductive layer. Alternatively, the body portion SPM1 of the first sensor pattern SP1 is located in the first conductive layer, the bridge portion SPD1 of the first sensor pattern SP1 is located in the second conductive layer, the second sensor pattern SP2 is located in the first conductive layer, and the touch wire TL is located in the first conductive layer. Alternatively, the body portion SPM1 of the first sensor pattern SP1 is located in the first conductive layer, and the bridge portion SPD1 of the first sensor pattern SP1 is located in the second conductive layer. The body portion SPM2 of the second sensor pattern SP2 is located in the first conductive layer, the bridge portion SPD2 of the second sensor pattern SP2 is located in the second conductive layer, and the touch wire TL is located in the first conductive layer.

The touch substrate may also include dummy electrode wires DU, and the dummy electrode wires DU may be located in a region not provided with a touch wire in the touch wire region. The dummy electrode wires DU may be arranged in the same layer as the touch wires. For example, the dummy electrode wires DU may be located in the first conductive layer.

A design of the dummy electrode wires may make a film layer where no touch wire region is arranged and a film layer where touch wire regions are provided have approximately a same thickness in the third direction. The third direction is perpendicular to both the first direction and the second direction. The design of the dummy electrode wires is conducive to improving the uniformity of the overall film layers, thereby improving the touch control consistency of the film layers.

In some embodiments, a connecting portion SPL is also provided between some of the body portions, and the connecting portion SPL may be located in a same layer as corresponding body portions SPM. The connecting part SPL and the bridge part SPD may be designed in a mixed manner, and the numbers of rows and columns of the touch wire regions in the touch substrate may be adjusted according to the specific requirements of the touch wires. The connecting portion SPL and the bridge portion SPD may be designed in a mixed manner, and this is conducive to reducing the quantity of the bridge portions while ensuring sufficient wiring space of the touch wires, and conducive to simplifying the process, and improving the stability of the touch substrate.

It should be noted that orders of preparing the first conductive layer and the second conductive layer may be interchanged. For example, the first conductive layer may be prepared first, and then the second conductive layer is prepared. Alternatively, the second conductive layer may be prepared first, and then the first conductive layer is prepared.

FIG. 11 is a partial plan view of the touch substrate according to the embodiments of the present disclosure.

Exemplarily, in some embodiments of the present disclosure, referring to FIG. 11, the touch substrate may include a first conductive layer and a second conductive layer. The body portions SPM of the sensor patterns SP may include a first body portion SPM10 located in the first conductive layer and a second body portion SPM20 located in the second conductive layer. Correspondingly, the bridge portions SPD may be located in the first conductive layer or the second conductive layer.

For example, referring to FIG. 2 and FIG. 11, the body portion SPM1 of the first sensor pattern SP1 is located in the first conductive layer, and the bridge portion SPD1 of the first sensor pattern SP1 is located in the second conductive layer. The body portion SPM2 of the second sensor pattern SP2 is located in the second conductive layer, and the bridge portion SPD2 of the second sensor pattern SP2 is located in the first conductive layer. That is, the body portion SPM1 of the first sensor pattern SP1 and the body portion SPM2 of the second sensor pattern SP2 may be located in different layers. A connecting bridge design may be used at an intersecting portion of the touch wire TL with the first sensor pattern SP1 or the second sensor pattern SP2. A part of the touch wires TL may be located in the first conductive layer and the other part thereof may be located in the second conductive layer.

For example, a connecting bridge at the intersecting portion of the touch wire with the sensor pattern may be a connecting bridge SPD for connecting the body portions of the sensor pattern, or a connecting bridge TLD for connecting the touch wires themselves. By designing a connecting bridge at the intersecting portion of the touch wire with the sensor pattern, the flexibility of wiring may be improved.

Exemplarily, the touch substrate may further include dummy electrode wires DU, and the dummy electrode wires DU may be provided in a region of the touch wire regions where no touch wire is provided. The dummy electrode wires DU may be provided in the same layer as the touch wires. For example, a part of the dummy electrode wires DU are located in the first conductive layer, and the other part of the dummy electrode wires DU are located in the second conductive layer.

The design of the dummy electrode wires may make a film layer where no touch wire region is arranged and a film layer where touch wire regions are provided have approximately a same thickness in the third direction. The design of the dummy electrode wires is conducive to improving the uniformity of the overall film layers, thereby improving the touch control consistency of the film layers.

FIG. 12 is a partial plan view of a touch substrate according to the embodiments of the present disclosure.

Exemplarily, in the embodiments of the present disclosure, referring to FIG. 12, the sensor patterns SP include a plurality of adjacent rows of first sensor patterns SP1, and at least some of the plurality of adjacent rows of first sensor patterns share one first touch sub-wire TL1. For example, adjacent three rows of the first sensor patterns SP1 in the plurality of rows of the first sensor patterns SP1 may form one group of the first sensor patterns. One group of the first sensor patterns may share one first touch sub-wire TL1. For example, in some embodiments, the quantity of rows of the first sensor patterns SP1 is large, while the quantity of pins of the control chips is small, and at least some of the adjacent the plurality of rows of first sensor patterns may share one first touch sub-wire TL1, thereby ensuring that each row of the first sensor patterns is connected with the pin of the control chip.

FIG. 13 is a partial plan view of a touch substrate according to the embodiments of the present disclosure.

Exemplarily, in the embodiments of the present disclosure, referring to FIG. 13, the sensor patterns SP includes a plurality of adjacent columns of second sensor patterns SP2, and at least some of the plurality of adjacent columns of second sensor patterns SP2 share one second touch sub-wire TL2. For example, three adjacent columns of the second sensor patterns SP2 in the plurality of columns of the second sensor patterns SP2 may form one group of the second sensor patterns. One group of the second sensor patterns may share one second touch sub-wire TL2. For example, in some embodiments, the quantity of columns of the second sensor patterns SP1 is large, while the quantity of pins of the control chips is small, and at least some of the plurality of adjacent columns of second sensor patterns may share one second touch sub-wire TL2, thereby ensuring that each column of the second sensor patterns is connected with the pin of the control chip.

By means that that adjacent rows of first sensor patterns share one first touch sub-wire, or adjacent columns of the second sensor patterns share one second touch sub-wire, the quantity of first touch sub-wires or second touch sub-wires may be reduced. In the case of a relatively small quantity of touch pins, it may be ensured that each sensor pattern is connected with the pin, and this is conducive to the overall control of the touch substrate.

FIG. 14 is a partial planar schematic diagram of a touch substrate according to the embodiments of the present disclosure.

Exemplarily, in the embodiments of the present disclosure, referring to FIG. 14, a plurality of rows of touch wires TL are provided in at least one row of first touch wire sub-regions TA1 in the plurality of rows of first touch wire sub-regions TA1. By providing a plurality of rows of touch wires TL in one row of first touch wire sub-regions TA1, the wire quantity of the touch wires TL may be increased in the case that the quantity of rows in the first touch wire sub-region TA1 is relatively small.

FIG. 15 is a partial plan view of the touch substrate according to the embodiments of the present disclosure.

Exemplarily, in the embodiments of the present disclosure, referring to FIG. 15, the plurality of columns of touch wires TL are provided in at least one column of the second touch wire sub-regions TA2 in the plurality of columns of the second touch wire sub-regions TA2. By providing the plurality of columns of touch wires TL in one column of the second touch wire sub-regions TA2, the wire quantity of the touch wires TL may be increased in the case that the quantity of the columns in the second touch wire sub-regions TA2 is relatively small.

A plurality of rows of touch wires may be arranged in a single row of first touch wire sub-regions TA1, or the plurality of columns of touch wires may be arranged in a single column of the second touch wire sub-regions TA2. With such a design, the quantity of wire channels of the touch wires may be increased, and this is conducive to a corresponding connection between the touch wires and the drive chips.

Optionally, referring to FIG. 1, according to the embodiments of the present disclosure, there is further provided a touch display substrate 1000, and the touch display substrate 1000 may include the touch substrate 100 according to any of the above embodiments.

FIG. 16 is a schematic diagram of a structure of a touch display device provided according to some embodiments of the present disclosure.

Optionally, according to the embodiments of the present disclosure, there is further provided a touch display device. Referring to FIG. 16, the touch display device 2000 may include the above touch substrate 100 or the above touch display substrate 1000. The touch display device may include but is not limited to: electronic paper, a mobile phone, a tablet computer, a display, a laptop, a digital photo frame, a navigator, and any other products or components with a display function. It should be understood that the touch display device has the same beneficial effects as the touch substrate provided in the foregoing embodiments.

Although some embodiments of the overall concept of the present disclosure have been shown and described, those skilled in the art will understand that modifications may be made to these embodiments without departing from the principle and spirit of the overall concept of the present disclosure, and the scope of the present disclosure is defined by the claims and the equivalents thereof.

What is claimed is:

1. A touch substrate comprising a touch layer, wherein the touch layer comprises sensor patterns, the sensor patterns comprise first sensor patterns and second sensor patterns, the first sensor patterns extend in a first direction and are spaced apart in a second direction intersecting with the first direction, the second sensor patterns extend in the second direction and are spaced apart in the first direction, and the first sensor pattern is insulated from the second sensor pattern;

at least one of the first sensor pattern and the second sensor pattern comprises a body portion and a bridge portion, a touch wire region is provided between at least some adjacent body portions, and body portions located on two sides of the touch wire region are connected through the bridge portion;

the touch substrate further comprises touch wires and lead wires, one end of the touch wire is connected with the sensor pattern, and the other end of the touch wire is connected with the lead wire, wherein at least some of the touch wires are arranged in the touch wire region, and an orthographic projection of the touch wire on a plane where the sensor pattern is located does not overlap with an orthographic projection of the body portion on the plane where the sensor pattern is located;

wherein the touch substrate comprises a first side region and a second side region provided opposite to the first side region, and the first side region and the second side region both extend in the first direction;

first ends of a plurality of columns of second sensor patterns are arranged in the first side region, and the lead wires are arranged in the second side region;

the touch wires comprise a plurality of second touch sub-wires, wherein ends of the plurality of second touch sub-wires are respectively connected with the first ends of the plurality of columns of the second sensor patterns; and the other ends of the plurality of second touch sub-wires are respectively connected with the lead wires;

wherein the second touch sub-wire comprises a first portion, a second portion and a third portion, and the second portion is located between the first portion and the third portion, wherein the second portion extends in the second direction, and the second portion is arranged in a second touch wire sub-region;

wherein the first portion comprises a first sub-portion arranged in a first touch wire sub-region and a second sub-portion arranged in the second touch wire sub-region, and the first sub-portion and the second sub-portion are arranged in a Z-shaped wiring.

2. The touch substrate according to claim 1, wherein the touch wire region comprises a plurality of rows of first touch wire sub-regions extending in the first direction and a plurality of columns of second touch wire sub-regions extending in the second direction, wherein the first direction is a row direction, the second direction is a column direction, and the plurality of rows of first touch wire sub-regions intersect with the plurality of columns of second touch wire sub-regions, so as to form the touch wire region of a mesh shape.

3. The touch substrate according to claim 1, wherein the third portion comprises a third sub-portion arranged in the first touch wire sub-region and a fourth sub-portion arranged in the second touch wire sub-region, and the third sub-portion and the fourth sub-portion are arranged in an L-shaped wiring.

4. The touch substrate according to claim 1, wherein the touch wires further comprise a plurality of first touch sub-wires, and the plurality of first touch sub-wires are respectively connected with the plurality of rows of first sensor patterns, wherein the first sensor pattern comprises a conductive transition portion located in a middle section of the first sensor pattern, one end of the first touch sub-wire is connected with the conductive transition portion, and the other end of the first touch sub-wire is connected with the lead wire located in the second side region.

5. The touch substrate according to claim 4, wherein the first touch sub-wire comprises a fourth portion, a fifth portion and a sixth portion, the fifth portion is located between the fourth portion and the sixth portion, wherein the fourth portion is connected with the first sensor pattern, and the sixth portion is connected with the lead wire;

the fourth portion extends in the second direction, the fifth portion extends in the first direction, and the sixth portion extends in the second direction.

6. The touch substrate according to claim 5, wherein the fourth portion is arranged in the second touch wire sub-region; or the fifth portion is arranged in the first touch wire sub-region; or the sixth portion is arranged in the second touch wire sub-region.

7. The touch substrate according to claim 4, wherein the touch substrate comprises a first region, a second region and a third region sequentially arranged in the first direction, wherein the second touch sub-wire is arranged in the first region or the third region; and the first touch sub-wire is arranged in the second region.

8. The touch substrate according to claim 7, wherein the touch substrate comprises N second touch sub-wires arranged in the first region and M second touch sub-wires arranged in the third region, wherein M is greater than or equal to 1, N is greater than or equal to 1, and M is equal to N; or M is not equal to N.

9. The touch substrate according to claim 7, wherein the touch substrate comprises L first touch sub-wires arranged in the second region, wherein L is greater than or equal to 1;

the second region comprises a first sub-region located on a first side of the conductive transition portion and a second sub-region located on a second side of the conductive transition portion, wherein a part of the plurality of rows of first sensor patterns are sequentially connected with the plurality of first touch sub-wires located in the first sub-region row by row; and another part of the plurality of rows of first sensor patterns are sequentially connected with the plurality of first touch sub-wires located in the second sub-region row by row.

10. The touch substrate according to claim 4, wherein the sensor patterns comprise a plurality of adjacent rows of first sensor patterns, and at least some of the plurality of adjacent rows of first sensor patterns share one first touch sub-wire, wherein the sensor patterns comprise a plurality of adjacent columns of second sensor patterns, and at least some of the plurality of adjacent columns of second sensor patterns share one second touch sub-wire, wherein a plurality of rows of touch wires are arranged in at least one row of first touch wire sub-regions in the plurality of rows of first touch wire sub-regions; or a plurality of columns of touch wires are arranged in at least one column of second touch wire sub-regions in the plurality of columns of second touch wire sub-regions.

11. The touch substrate according to claim 1, wherein the touch substrate comprises a first conductive layer and a second conductive layer, wherein the body portion of the sensor pattern is located in the first conductive layer, and the bridge portion of the sensor pattern is located in the second conductive layer.

12. The touch substrate according to claim 11, wherein the touch wires are located in the first conductive layer; or a part of the touch wires are located in the first conductive layer, and the other part of the touch wires are located in the second conductive layer.

13. The touch substrate according to claim 11, wherein the touch substrate further comprises dummy electrode wires arranged in a region not provided with a touch wire in the touch wire region, wherein the dummy electrode wires are located in the first conductive layer; or a part of the dummy electrode wires are located in the first conductive layer, and the other part of the dummy electrode wires are located in the second conductive layer.

14. The touch substrate according to claim 1, wherein the touch substrate comprises a first conductive layer and a second conductive layer, wherein the body portion of the sensor pattern comprises a first body portion located in the first conductive layer and a second body portion located in the second conductive layer; and the bridge portion is located in the first conductive layer, or the bridge portion is located in the second conductive layer.

15. A touch display substrate, comprising the touch substrate according to claim 1.

16. The touch display substrate according to claim 15, wherein the touch display substrate comprises a display region, and at least one of the touch wires is located in the display region, wherein the touch display substrate further comprises a base substrate and an encapsulation layer, and the touch layer is located on a side of the encapsulation layer away from the base substrate.

17. A touch display device, comprising the touch display substrate according to claim 15.

* * * * *